United States Patent
Yasu et al.

(10) Patent No.: US 12,523,769 B2
(45) Date of Patent: Jan. 13, 2026

(54) RANGING SENSOR, METHOD FOR DRIVING THE SAME, AND RANGING MODULE

(71) Applicant: Sony Semiconductor Solutions Corporation, Kanagawa (JP)

(72) Inventors: Yohtaro Yasu, Kanagawa (JP); Jayesh Hannurkar, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1033 days.

(21) Appl. No.: 17/627,962

(22) PCT Filed: Aug. 17, 2020

(86) PCT No.: PCT/JP2020/030953
§ 371 (c)(1),
(2) Date: Jan. 18, 2022

(87) PCT Pub. No.: WO2021/039458
PCT Pub. Date: Mar. 4, 2021

(65) Prior Publication Data
US 2022/0252727 A1 Aug. 11, 2022

(30) Foreign Application Priority Data
Aug. 29, 2019 (JP) ................................. 2019-157074

(51) Int. Cl.
*G01S 17/36* (2006.01)
*G01S 7/4914* (2020.01)
*G01S 7/4915* (2020.01)

(52) U.S. Cl.
CPC ............ *G01S 17/36* (2013.01); *G01S 7/4914* (2013.01); *G01S 7/4915* (2013.01)

(58) Field of Classification Search
None
See application file for complete search history.

(56) References Cited

U.S. PATENT DOCUMENTS

| 2005/0156121 A1 | 7/2005 | Bamji |
| 2009/0045359 A1 | 2/2009 | Kumahara |

(Continued)

FOREIGN PATENT DOCUMENTS

| CN | 1601753 A | 3/2005 |
| CN | 109543560 A | 3/2019 |

(Continued)

OTHER PUBLICATIONS

International Search Report (PCT/ISA/210), International Application No. PCT/JP2020/026700, dated Jul. 31, 2020.

(Continued)

*Primary Examiner* — Luke D Ratcliffe
(74) *Attorney, Agent, or Firm* — Michael Best & Friedrich LLP

(57) ABSTRACT

Ranging sensors with reduced cyclic errors and drive current dispersion are disclosed. In one example, a ranging sensor includes a phase shift circuit that generates a phase-shifted drive pulse signal by shifting a drive pulse signal to a plurality of phases in a time division manner within one frame period, with the drive pulse signal being generated in response to a light emission control signal indicating an irradiation timing of a light emission source. A pixel accumulates electric charges on the basis of the phase-shifted drive pulse signal and outputs a detection signal corresponding to the accumulated electric charges, with the electric charges being obtained by photoelectrically converting reflected light by a predetermined object. The technology can be applied to a ranging module or the like that measures a distance to a predetermined object, for example.

18 Claims, 28 Drawing Sheets

(56) References Cited

U.S. PATENT DOCUMENTS

| 2014/0218570 | A1 | 8/2014 | Payne |
| 2015/0156121 | A1 | 6/2015 | Yang |
| 2017/0315238 | A1* | 11/2017 | Nagai ................... G01S 7/4915 |
| 2018/0052231 | A1 | 2/2018 | Cho et al. |
| 2019/0208150 | A1* | 7/2019 | Jin .......................... G01S 17/36 |
| 2019/0293792 | A1* | 9/2019 | Keel ...................... H04N 25/00 |

FOREIGN PATENT DOCUMENTS

| CN | 109994494 A | 7/2019 |
| JP | 2009085707 A | 4/2009 |
| TW | I276351 B | 3/2007 |
| WO | 2009051499 A1 | 4/2009 |
| WO | 2017121820 A1 | 7/2017 |
| WO | 2017145450 A1 | 8/2017 |

OTHER PUBLICATIONS

Cyrus S Bamji, et al., 5.8 1Mpixel 65nm BSI 320MHz Demodulated TOF Image Sensor with 3.5um Global Shutter Pixels and Analog Binning, Microsoft Corp., 2018 IEEE International Solid-State Circuits Conference Session 5 / Image Sensors, Feb. 12, 2018cs.

Min-Sun Keel, et al., A 640×480 Indirect Time-of-Flight CMOS Image Sensor with 4-tap 7-µm Global-Shutter Pixel and Fixed-Pattern Phase Noise Self-Compensation Scheme, Samsung Electronics Co., Ltd., 2019 Symposium on VLSI Circuits Digest of Technical Papers.

* cited by examiner

FIG. 14

2-phase METHOD

FIRST FRAME: I = (A, B) = (0°, 180°)

SECOND FRAME: Q = (A, B) = (90°, 270°)

→ I & Q COEXISTING

FIG. 16

| 0 I 180 | 90 Q 270 | 0 I 180 | 90 Q 270 |
|---|---|---|---|
| 90 Q 270 | 0 I 180 | 90 Q 270 | 0 I 180 |
| 0 I 180 | 90 Q 270 | 0 I 180 | 90 Q 270 |
| 90 Q 270 | 0 I 180 | 90 Q 270 | 0 I 180 |

I & Q COEXISTING

RANGING SENSOR, METHOD FOR DRIVING THE SAME, AND RANGING MODULE

TECHNICAL FIELD

The present technology relates to a ranging sensor, a method for driving the ranging sensor, and a ranging module, and more particularly, to a ranging sensor capable of achieving both reduction of cyclic errors and dispersion of the drive current, a method for driving the ranging sensor, and a ranging module.

BACKGROUND ART

A ToF sensor that measures a distance to an object by measuring a flight time of light outputs modulated light from a light emission source, and receives light reflected by the object. In distance measurement, the modulated light output from the light emission source is subjected as a sine waveform to signal processing. However, the light actually output from the light emission source has a rectangular waveform, and processing the rectangular wave as a sine wave causes a periodic error (hereinafter referred to as a cyclic error) in the measured value.

For example, there is a disclosed technique for reducing cyclic errors by generating a pseudo sine wave through a shift of the phase of modulated light output from a light emission source (see Patent Document 1, for example).

Meanwhile, the number of pixels in a ToF sensor has been increasing these days. When a large number of pixels are driven at the same time, concentration of the drive current generates an intense charge/discharge current and causes an IR drop, and the pixels are not accurately driven in some cases. To counter this, there also are techniques for reducing the peak current and preventing an IR drop by dispersing the pixel drive (see Non-Patent Documents 1 and 2, for example).

CITATION LIST

Patent Document

Patent Document 1: WO 2009/051499 A

Non-Patent Documents

Non-Patent Document 1: Cyrus S. Bamji, et al., 5.8 1Mpixel 65 nm BSI 320 MHz Demodulated TOF Image Sensor with 3.5 um Global Shutter Pixels and Analog Binning, Microsoft Corp., 2018 IEEE International Solid-State Circuits Conference SESSION 5/IMAGE SENSORS, Feb. 12, 2018

Non-Patent Document 2: Min-Sun Keel, et al., A 640×480 Indirect Time-of-Flight CMOS Image Sensor with 4-tap 7-µm Global-Shutter Pixel and Fixed-Pattern Phase Noise Self-Compensation Scheme, Samsung Electronics Co., Ltd., 2019 Symposium on VLSI Circuits Digest of Technical Papers

SUMMARY OF THE INVENTION

Problems to be Solved by the Invention

However, the techniques disclosed in Non-Patent Documents 1 and 2 do not take cyclic errors into consideration. Any method has not been suggested for achieving both reduction of cyclic errors and dispersion of the drive current.

The present technology has been made in view of such circumstances, and aims to achieve both reduction of cyclic errors and dispersion of the drive current.

Solutions to Problems

A ranging sensor according to a first aspect of the present technology includes: a phase shift circuit that generates a phase-shifted drive pulse signal by shifting a drive pulse signal to a plurality of phases in a time division manner within one frame period, the drive pulse signal being generated in response to a light emission control signal indicating an irradiation timing of a light emission source; and a pixel that accumulates electric charges on the basis of the phase-shifted drive pulse signal and outputs a detection signal corresponding to the accumulated electric charges, the electric charges being obtained by photoelectrically converting reflected light that is reflected by a predetermined object reflecting light emitted from the light emission source.

A method for driving a ranging sensor including a phase shift circuit and a pixel according to a second aspect of the present technology includes: generating a phase-shifted drive pulse signal by shifting a phase of a drive pulse signal generated in accordance with a light emission control signal indicating an irradiation timing of a light emission source, the phase shift circuit generating the phase-shifted drive pulse signal; and accumulating electric charges on the basis of the phase-shifted drive pulse signal and outputs a detection signal corresponding to the accumulated electric charges, the electric charges being obtained by photoelectrically converting reflected light that is reflected by a predetermined object reflecting light emitted from the light emission source, the pixel accumulating the electric charges and outputting the detection signal.

A ranging module according to a third aspect of the present technology includes: a light emission source that emits light onto a predetermined object at an irradiation timing based on a light emission control signal; and a ranging sensor that receives reflected light that is reflected by the predetermined object reflecting the light emitted from the light emission source. In the ranging module, the ranging sensor includes: a phase shift circuit that generates a phase-shifted drive pulse signal by shifting a phase of a drive pulse signal generated in response to the light emission control signal; and a pixel that accumulates electric charges on the basis of the phase-shifted drive pulse signal and outputs a detection signal corresponding to the accumulated electric charges, the electric charges being obtained by photoelectrically converting the reflected light.

In the first to third aspects of the present technology, a phase-shifted drive pulse signal is generated by shifting the phase of a drive pulse signal generated in response to a light emission control signal indicating the irradiation timing of a light emission source, electric charges obtained by photoelectrically converting reflected light that is reflected by a predetermined object reflecting light emitted from the light emission source are accumulated on the basis of the phase-shifted drive pulse signal, and a detection signal corresponding to the accumulated electric charges is output from a pixel.

The ranging sensor and the ranging module may be independent devices, or may be modules to be incorporated into some other apparatus.

BRIEF DESCRIPTION OF DRAWINGS

FIG. 14 is a diagram for explaining IQ mosaic drive.

FIG. 16 is a diagram for explaining IQ mosaic drive.

MODE FOR CARRYING OUT THE INVENTION

Figure 1:
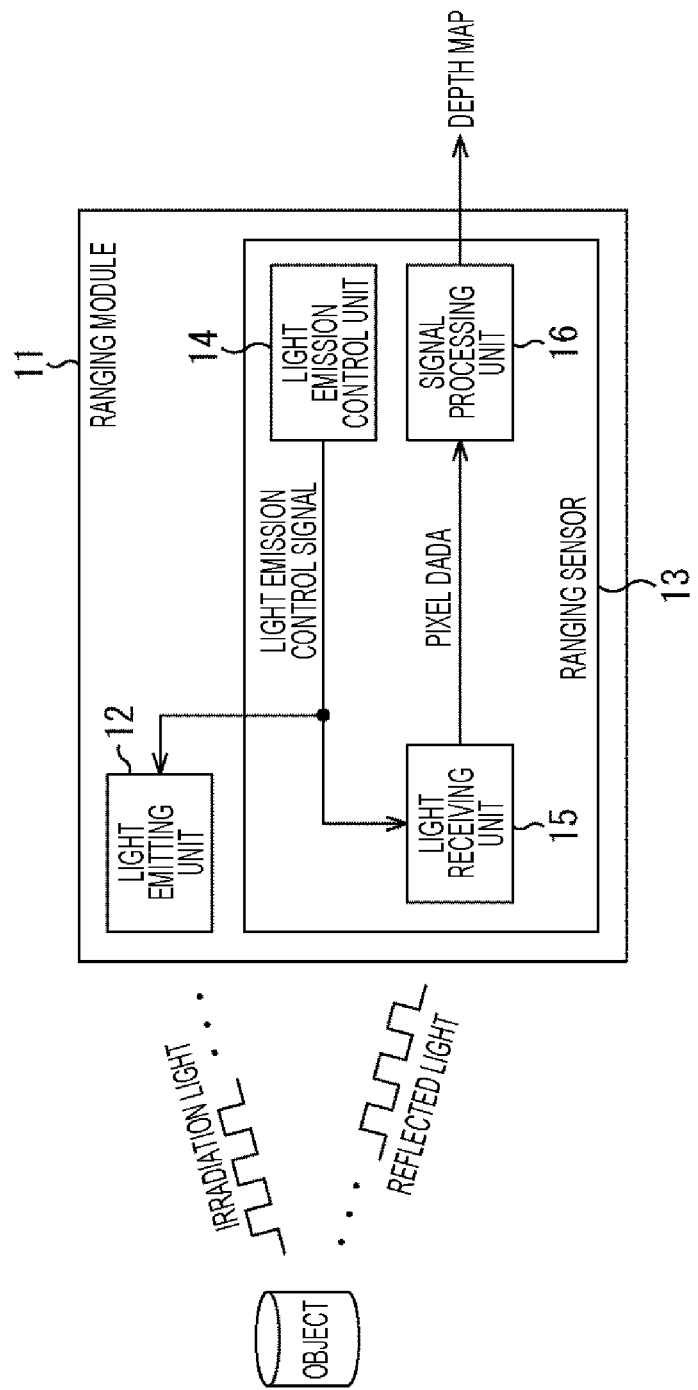
FIG. 1 is a block diagram showing a schematic example configuration of a ranging module to which the present technology is applied.

The following is a description of modes (hereinafter referred to as embodiments) for carrying out the present technology. Note that explanation will be made in the following order.

1. Specific example configuration of a ranging module
2. Basic pixel drive by an indirect ToF method
3. Problem with simultaneous drive of all pixels
4. Specific example configurations of the light receiving unit
5. Example chip configuration of the ranging sensor
6. Example configuration of an electronic apparatus
7. Example applications to mobile structures <1. Schematic Example Configuration of a Ranging Module>

FIG. 1 is a block diagram showing a schematic example configuration of a ranging module to which the present technology is applied.

A ranging module 11 shown in FIG. 1 is a ranging module that performs ranging by an indirect ToF method, and includes a light emitting unit 12 and a ranging sensor 13. The ranging module 11 irradiates an object with light (irradiation light), and receives the light (reflected light) reflected by the object. By doing so, the ranging module 11 generates and outputs a depth map as information indicating the distance to the object. The ranging sensor 13 includes a light emission control unit 14, a light receiving unit 15, and a signal processing unit 16.

The light emitting unit 12 includes a VCSEL array in which a plurality of vertical cavity surface emitting lasers (VCSELs) is arranged in a planar manner as a light emission source, emits light while modulating the light at the timing corresponding to a light emission control signal supplied from the light emission control unit 14, and irradiates the object with irradiation light, for example.

The light emission control unit 14 controls the light emitting unit 12 by supplying a light emission control signal of a predetermined frequency (such as 200 MHz, for example) to the light emitting unit 12. The light emission control unit 14 also supplies the light emission control signal to the light receiving unit 15, to drive the light receiving unit 15 in time with the light emission timing at the light emitting unit 12.

As will be described later in detail with reference to FIG. 2, in a pixel array 32 in which a plurality of pixels 31 is two-dimensionally arranged, the light receiving unit 15 receives reflected light from the object. The light receiving unit 15 then supplies pixel data including a detection signal corresponding to the amount of the received reflected light to the signal processing unit 16 for each pixel 31 in the pixel array 32.

On the basis of the pixel data supplied from the light receiving unit 15 for each pixel 31 in the pixel array 32, the signal processing unit 16 calculates the depth value indicating the distance from the ranging module 11 to the object, generates a depth map storing the depth value as the pixel value of each pixel 31, and outputs the depth map to the outside of the module.

<2. Basic Pixel Drive by the Indirect ToF Method>

Prior to a detailed description of pixel drive to be performed by the light receiving unit 15 of the present disclosure, basic pixel drive (basic pixel drive) by the Indirect ToF method is explained.

Figure 2:
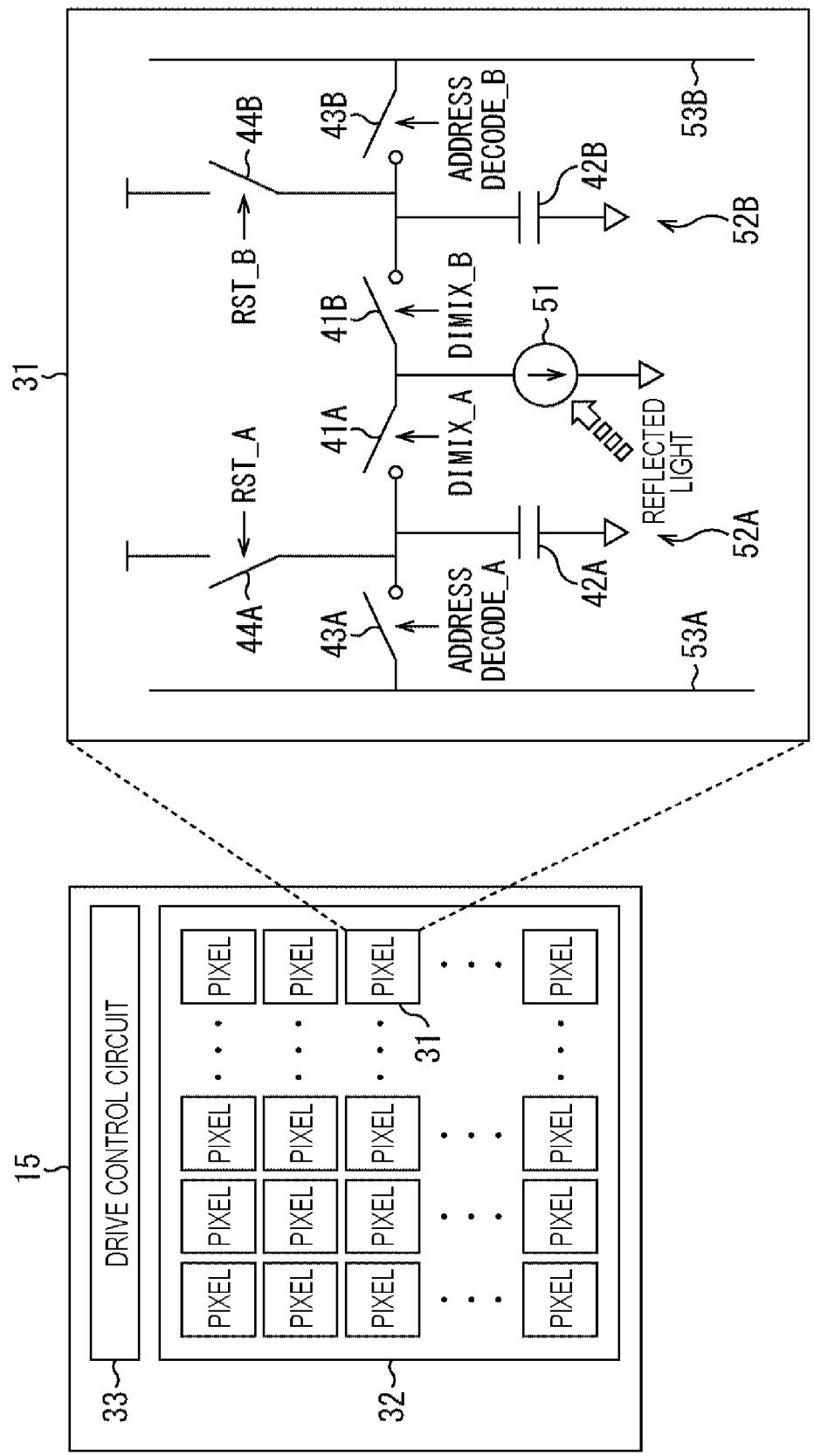
FIG. 2 is a block diagram showing a specific example configuration of a light receiving unit.

FIG. 2 is a block diagram showing a specific example configuration of the light receiving unit 15.

The light receiving unit 15 includes: the pixel array 32 in which the pixels 31 that generate electric charges corresponding to the amount of received light and output detection signals corresponding to the electric charges are two-dimensionally arranged in the row direction and the column direction in a matrix; and a drive control circuit 33 disposed in a peripheral region of the pixel array 32.

The drive control circuit 33 outputs control signals (such as distribution signals DIMIX, selection signals ADDRESS DECODE, and reset signals RST that will be described later, for example) for controlling the drive of the pixels 31, on the basis of a light emission control signal supplied from the light emission control unit 14 and the like, for example.

A pixel 31 includes a photodiode 51 as a photoelectric conversion portion that generates electric charges corresponding to the amount of received light, and a first tap 52A and a second tap 52B that detect the electric charges generated by the photodiode 51. In the pixel 31, the electric charges generated in the single photodiode 51 are distributed to the first tap 52A or the second tap 52B. Of the electric charges generated by the photodiode 51, the electric charges distributed to the first tap 52A are then output as a detection signal A from a signal line 53A, and the electric charges distributed to the second tap 52B are output as a detection signal B from a signal line 53B.

The first tap 52A includes a transfer transistor 41A, a floating diffusion (FD) portion 42A, a selection transistor 43A, and a reset transistor 44A. Likewise, the second tap 52B includes a transfer transistor 41B, an FD portion 42B, a selection transistor 43B, and a reset transistor 44B.

Figure 3:
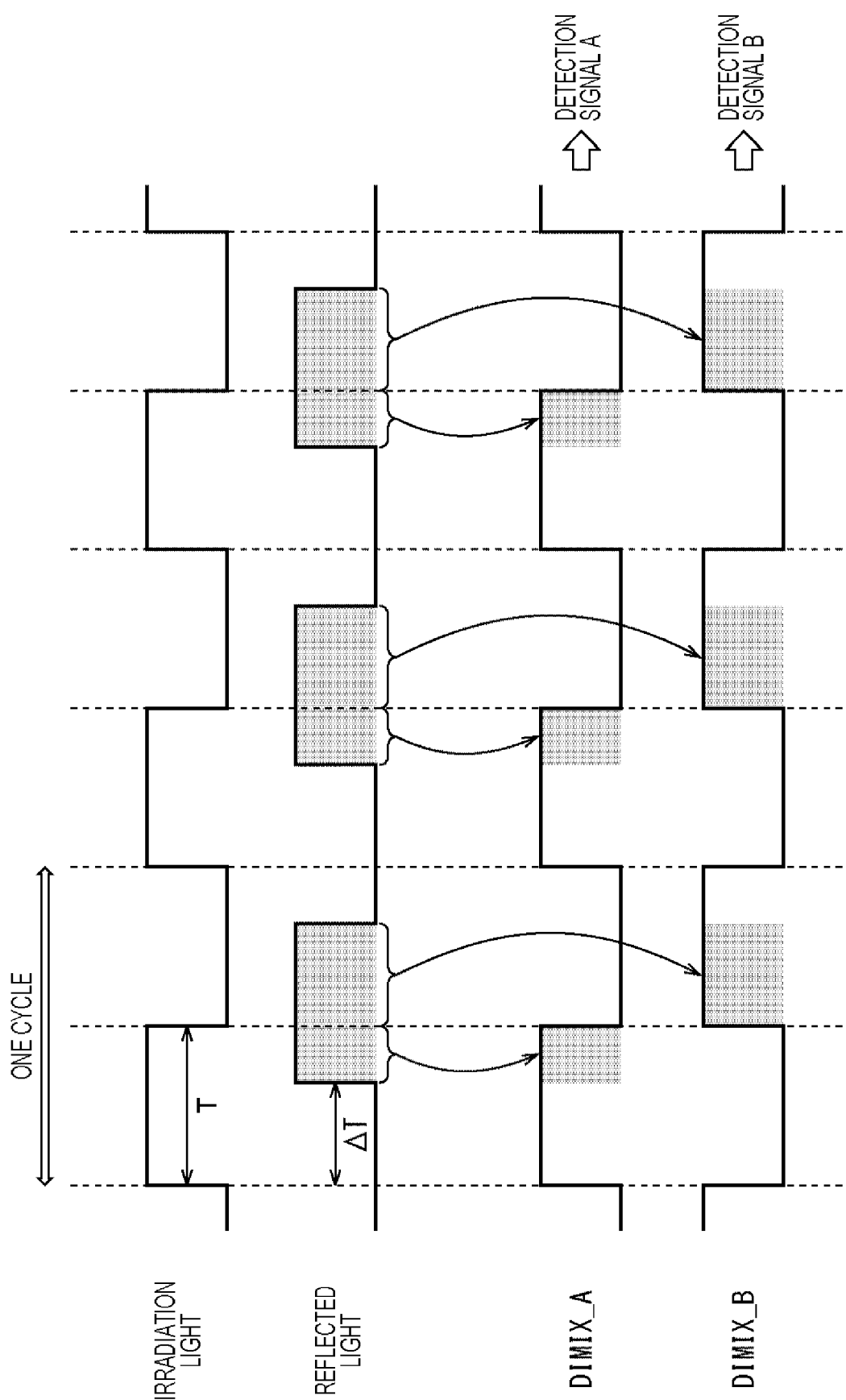
FIG. 3 is a chart for explaining operation of a pixel.

As shown in FIG. 3, irradiation light modulated (one cycle=2 T) so as to repeatedly switch on and off the irradiation within an irradiation time T is output from the light emitting unit 12, and reflected light is received by the photodiode 51, with a delay time ΔT depending on the distance to the object. Further, a distribution signal DIMIX_A controls switching on and off of the transfer transistor 41A, and a distribution signal DIMIX_B controls switching on and off of the transfer transistor 41B. The distribution signal DIMIX_A is a signal of the same phase as the irradiation light, and the distribution signal DIMIX_B is a signal of the reversed phase of the distribution signal DIMIX_A.

Therefore, in FIG. 2, the electric charges generated by the photodiode 51 receiving reflected light are transferred to the FD portion 42A while the transfer transistor 41A is on in accordance with the distribution signal DIMIX_A, and are transferred to the FD portion 42B while the transfer transistor 41B is on in accordance with the distribution signal DIMIX_B. As a result, in a predetermined period during which irradiation light with an irradiation time T is periodically emitted, the electric charges transferred via the transfer transistor 41A are sequentially accumulated in the FD portion 42A, and the electric charges transferred via the transfer transistor 41B are sequentially accumulated in the FD portion 42B.

Further, when the selection transistor 43A is turned on in accordance with a selection signal ADDRESS DECODE_A after the end of the electric charge accumulation period, the electric charges accumulated in the FD portion 42A are read out via the signal line 53A, and the detection signal A corresponding to the charge amount is output from the light receiving unit 15. Likewise, when the selection transistor 43B is turned on in accordance with a selection signal ADDRESS DECODE_B, the electric charges accumulated in the FD portion 42B are read out via the signal line 53B, and the detection signal B corresponding to the charge amount is output from the light receiving unit 15. Further, the electric charges accumulated in the FD portion 42A are released when the reset transistor 44A is turned on in accordance with a reset signal RST_A, and the electric charges accumulated in the FD portion 42B are released when the reset transistor 44B is turned on in accordance with a reset signal RST_B.

As described above, the pixel 31 distributes the electric charges generated by the photodiode 51 receiving reflected light to the first tap 52A or the second tap 52B in accordance with the delay time ΔT, and outputs the detection signal A and the detection signal B as pixel data.

The signal processing unit 16 calculates a depth value, on the basis of the detection signal A and the detection signal B supplied as pixel data from each pixel 31. Examples of methods for calculating a depth value include a 2-phase method using detection signals of two kinds of phases, and a 4-phase method using detection signals of four kinds of phases.

The 2-phase method and the 4-phase method are now described.

Figure 4:
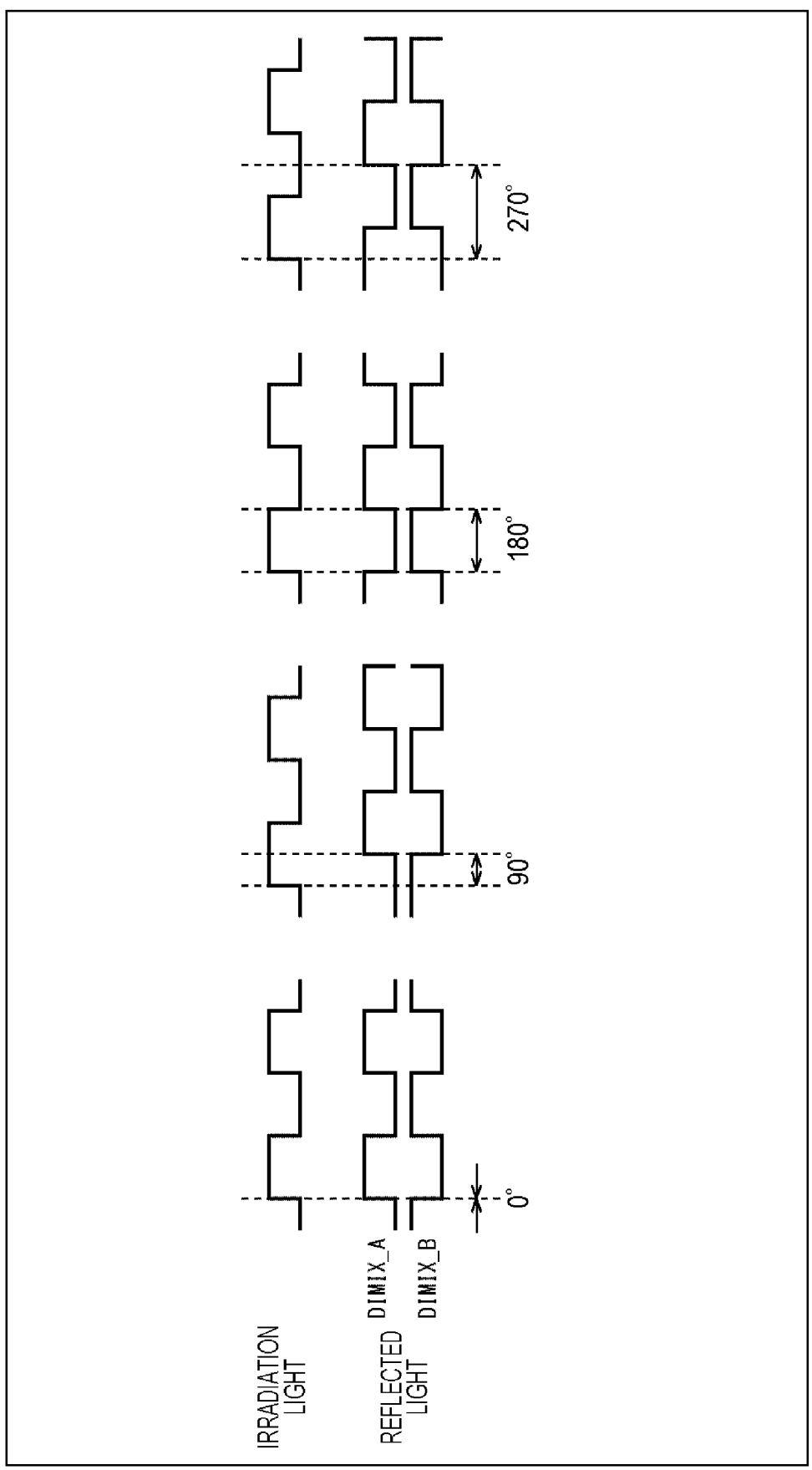
FIG. 4 is a chart for explaining a 2-phase method and a 4-phase method.

As shown in FIG. 4, by the 4-phase method, the light receiving unit 15 receives reflected light at the light receiving timing with the phase shifted by 0°, 90°, 180°, and 270° with respect to the irradiation timing of the irradiation light. More specifically, the light receiving unit 15 receives reflected light by changing the phase in a time division manner: receiving light with the phase set at 0° with respect to the irradiation timing of the irradiation light during a frame period, receiving light with the phase set at 90° during the next frame period, receiving light with the phase set at 180° during the frame period after the next, and receiving light with the phase set at 270° during the frame period after that.

Note that the phase of 0°, 90°, 180°, or 270° indicates the phase at the first tap 52A of the pixel 31, unless otherwise specified. The second tap 52B has a phase that is the reverse of that of the first tap 52A. Therefore, when the first tap 52A is in the phase of 0°, 90°, 180°, or 270°, the second tap 52B is in the phase of 180°, 270°, 0°, or 90°, respectively.

Figure 5:
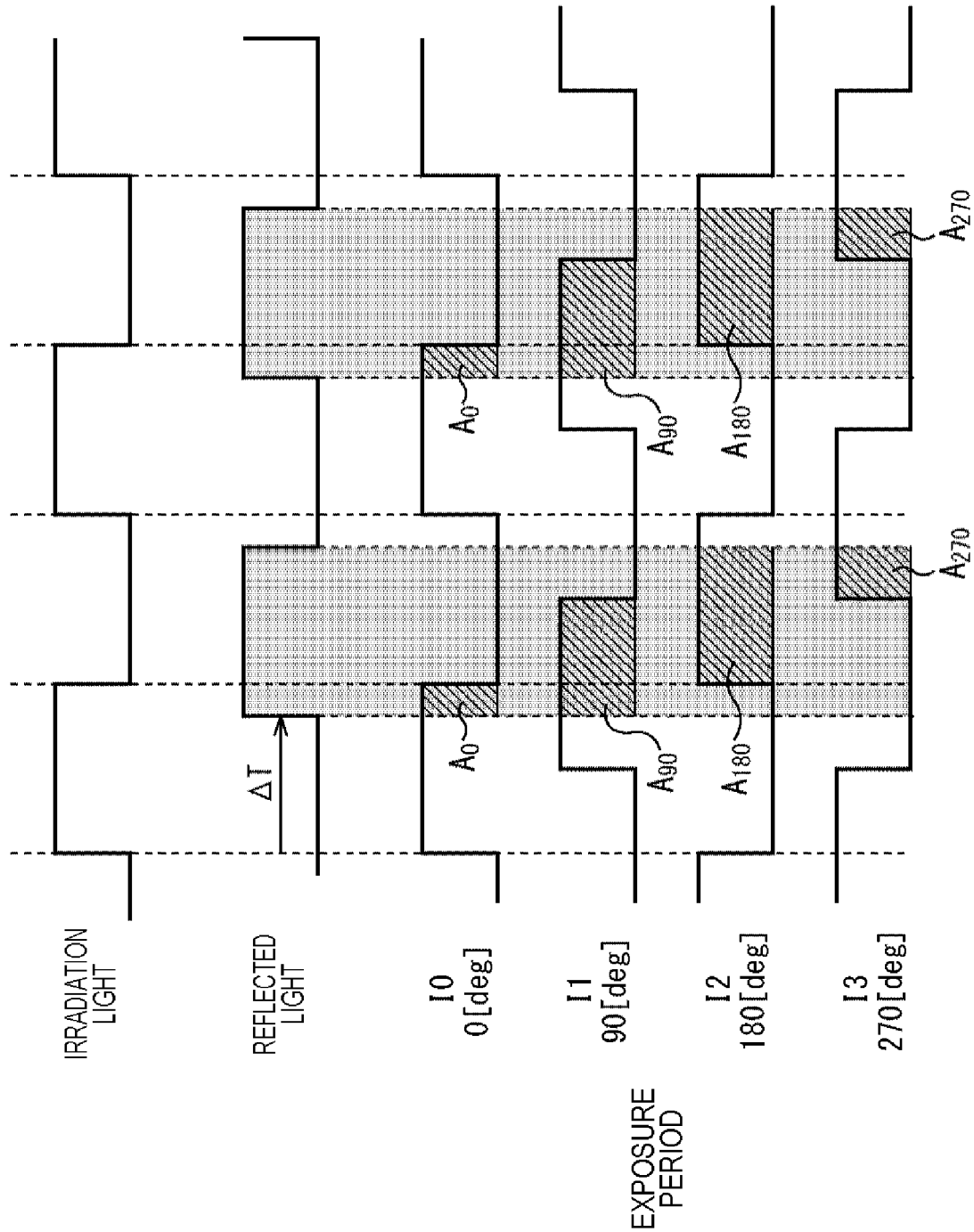
FIG. 5 is a chart for explaining the 2-phase method and the 4-phase method.

FIG. 5 is a chart showing the exposure periods of the first tap 52A of the pixel 31 in the respective phases of 0°, 90°, 180°, and 270°, which are shown in such a manner that the phase differences can be easily understood.

As shown in FIG. 5, in the first tap 52A, the detection signal A obtained by receiving light in the same phase (phase 0°) as the irradiation light is referred to as the detection signal $A_0$, the detection signal A obtained by receiving light in the phase (phase 90°) shifted by 90 degrees from the irradiation light is referred to as the detection signal $A_{90}$, the detection signal A obtained by receiving light in the phase (phase 180°) shifted by 180 degrees from the irradiation light is referred to as the detection signal $A_{180}$, and the detection signal A obtained by receiving light in the phase (phase 270°) shifted by 270 degrees from the irradiation light is referred to as the detection signal $A_{270}$.

Likewise, although not shown in the chart, in the second tap 52B, the detection signal B obtained by receiving light in the same phase (phase 0°) as the irradiation light is referred to as the detection signal $B_0$, the detection signal B obtained by receiving light in the phase (phase 90°) shifted by 90 degrees from the irradiation light is referred to as the detection signal $B_{90}$, the detection signal B obtained by receiving light in the phase (phase 180°) shifted by 180 degrees from the irradiation light is referred to as the detection signal $B_{180}$, and the detection signal B obtained by receiving light in the phase (phase 270°) shifted by 270 degrees from the irradiation light is referred to as the detection signal $B_{270}$.

Figure 6:
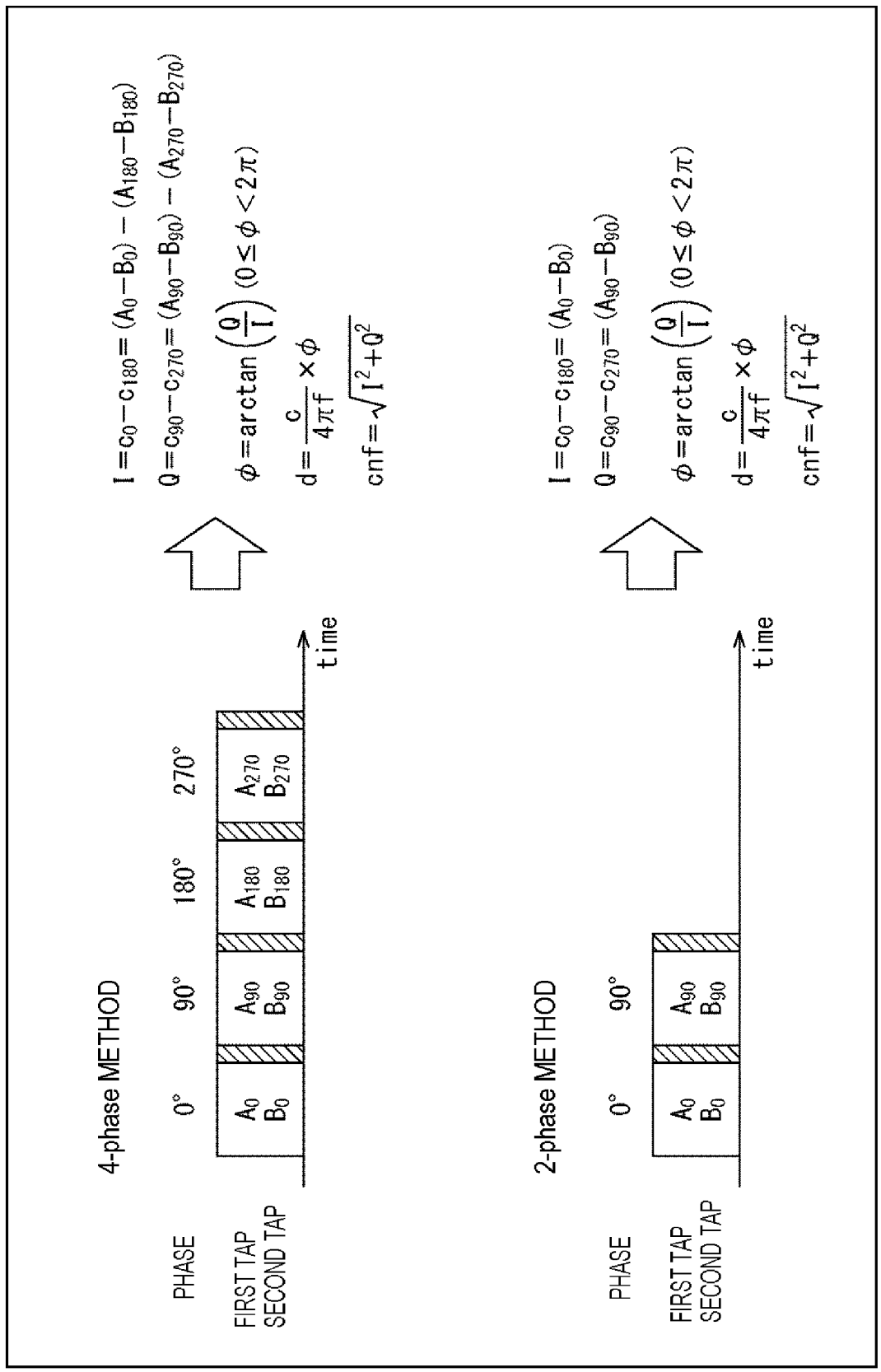
FIG. 6 is a chart for explaining the 2-phase method and the 4-phase method.

FIG. 6 is a diagram for explaining the methods for calculating a depth value and reliability by the 2-phase method and the 4-phase method.

By the Indirect ToF method, a depth value d can be calculated according to Equation (1) shown below.

[Mathematical Formula 1]
$$d = \frac{c \cdot \Delta T}{2} = \frac{c \cdot \phi}{4\pi f} \quad (1)$$

In Equation (1), c represents the speed of light, $\Delta T$ represents the delay time, and f represents the modulation frequency of light. Further, $\varphi$ in Equation (1) represents the phase shift amount [rad] of reflected light, and is expressed by Equation (2) shown below.

[Mathematical Formula 2]
$$\phi = \arctan\left(\frac{Q}{I}\right)(0 \leq \phi < 2\pi) \quad (2)$$

By the 4-phase method, I and Q in Equation (2) are calculated according to Equation (3) shown below, using the detection signals $A_0$ to $A_{270}$ and the detection signals $B_0$ to $B_{270}$ obtained by setting the phase at 0°, 90°, 180°, and 270°. I and Q are signals obtained by converting the phase of a sine wave from a polar coordinate system to an orthogonal coordinate system (an I-Q plane), on the assumption that a change in the luminance of the irradiation light is a sine wave.

$$I = c_0 - c_{180} = (A_0 - B_0) - (A_{180} - B_{180})$$

$$Q = c_{90} - c_{270} = (A_{90} - B_{90}) - (A_{270} - B_{270}) \quad (3)$$

By the 4-phase method, a difference between detection signals of opposite phases in the same pixel is calculated as in "$A_0 - A_{180}$" and "$A_{90} - A_{270}$" in Equation (3), for example. In this manner, it is possible to remove characteristic variation between the taps in each pixel, which is a sensitivity difference between the taps.

By the 2-phase method, on the other hand, I and Q in Equation (2) can be calculated using detection signals in two phases: the phase 0° and the phase 90°. That is, I and Q in Equation (2) according to the 2-phase method are expressed by Equation (4) shown below.

$$I = c_0 - c_{180} = (A_0 - B_0)$$

$$Q = c_{90} - c_{270} = (A_{90} - B_{90}) \quad (4)$$

By the 2-phase method, the characteristic variation between the taps in each pixel cannot be removed, but the depth value d to the object can be calculated only with detection signals in two phases. Accordingly, ranging can be performed at a frame rate twice that of the 4-phase method. The characteristic variation between the taps can be adjusted with correction parameters such as gain and offset, for example.

Reliability cnf can be calculated according to Equation (5) shown below, by both the 2-phase method and the 4-phase method.

[Mathematical Formula 3]
$$cnf = \sqrt{I^2 + Q^2} \quad (5)$$

As can be seen from Equation (5), the reliability cnf corresponds to the magnitude of reflected light received by the pixel 31, which is luminance information (the luminance value).

Note that, hereinafter, a unit in which each pixel 31 of the pixel array 32 outputs pixel data (a detection signal) of one phase such as 0°, 90°, 180°, or 270° will be referred to as one frame (period). By the 4-phase method, one depth map is generated for four frames including four phases. In the case of the 2-phase method, one depth map is generated for two frames including two phases.

<3. Problems with Simultaneous Drive of all Pixels>

When the basic pixel drive described above is performed at the same time for all the pixels 31 in the pixel array 32, the problems described below will occur.

(1) Occurrence of an IR Drop

The drive control circuit 33 performs control to distribute the electric charges generated by the photodiode 51 to the first tap 52A or the second tap 52B, in accordance with the distribution signals DIMIX_A and DIMIX_B. In a case where the number of pixels in the pixel array 32 is large, when all the pixels 31 in the pixel array 32 are driven at the same time, the drive current concentrates, and an intense charge/discharge current causes an IR drop. As a result, the distribution signals DIMIX_A and DIMIX_B become blunt signals, and a situation in which distribution of electric charges cannot be accurately controlled might occur. In a case where the number of pixels (resolution) in the pixel array 32 is larger than a VGA of 640×480, for example, when all the pixels in the pixel array 32 are driven at the same time, the influence of an IR drop will be great.

(2) Degradation of EMC/EMI

Furthermore, when all the pixels 31 in the pixel array 32 are driven at the same time, the peak current becomes larger. As a result, the electromagnetic waves generated from the ranging sensor 13 also become larger, and electromagnetic compatibility (EMC) and electromagnetic interference (EMI) are degraded.

Therefore, it is desirable to disperse the drive of all the pixels in the pixel array 32, and scatter the peak current.

(3) Occurrence of Cyclic Errors

As described above, the depth value d is calculated on the assumption that a change in the luminance of the irradiation light is a sine wave. In practice, however, light emitted from the light emitting unit 12 is a rectangular wave as shown in FIG. 3. Therefore, when the rectangular wave is processed as a sine wave, a periodic error (hereinafter referred to as a cyclic error) occurs in the depth value d.

The light receiving unit 15 of the present disclosure disperses the drive of all the pixels in the pixel array 32, scatters the peak current, and performs the drive for reducing cyclic errors. In the description below, the drive of the light receiving unit 15 will be described in detail.

<4. Specific Example Configurations of the Light Receiving Unit>

<Example in which the Phase Control Division Number is Two>

Figure 7:
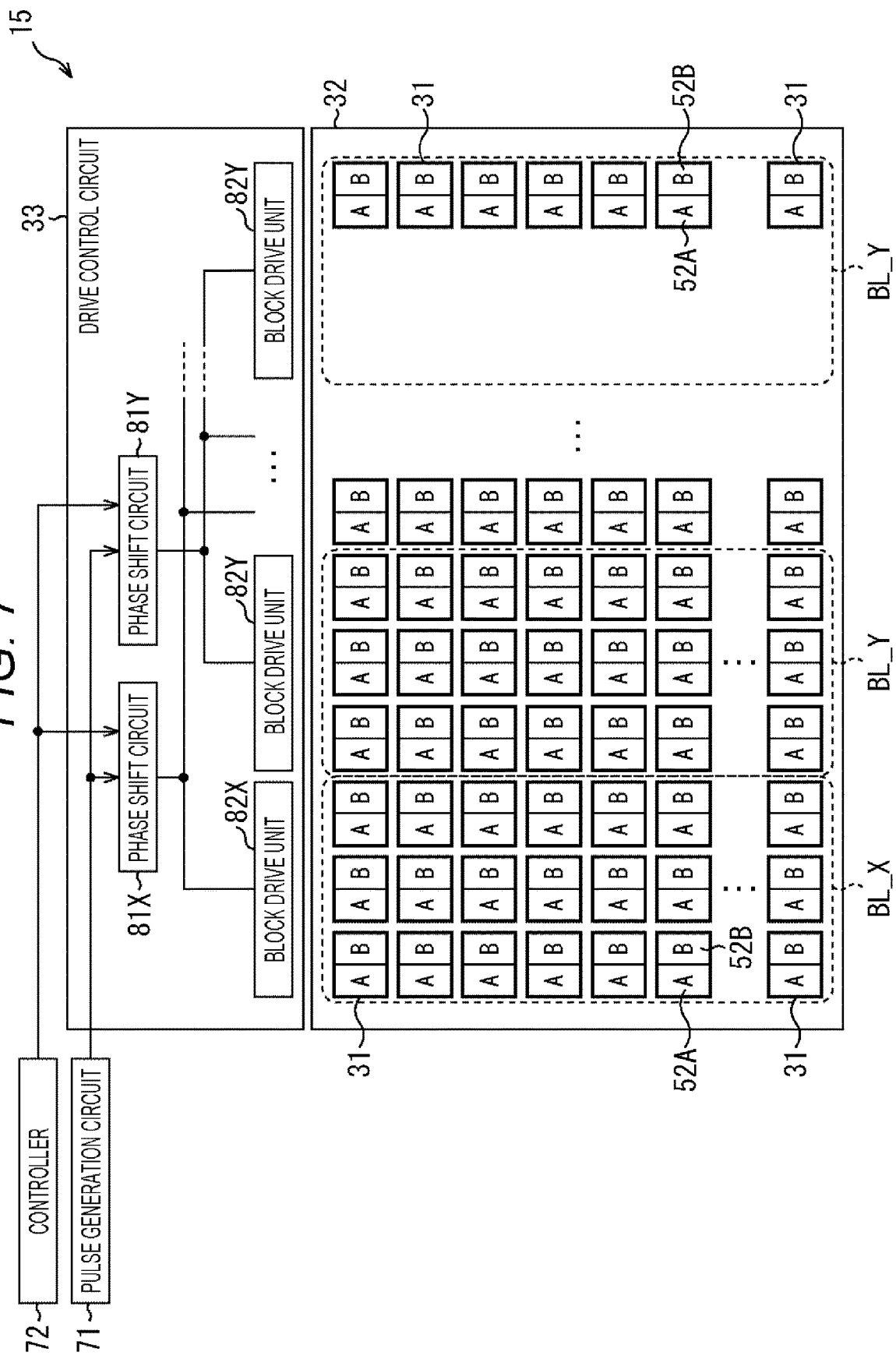
FIG. 7 is a block diagram showing a more specific example configuration of the light receiving unit.

FIG. 7 is a block diagram showing a more specific example configuration of the light receiving unit 15.

As described above with reference to FIG. 2, the light receiving unit 15 includes the pixel array 32 in which the pixels 31 are two-dimensionally arranged, and the drive control circuit 33. Note that, in FIG. 7, the first tap 52A and the second tap 52B of the pixel 31 shown in FIG. 2 are simplified and shown as "A" and "B".

In the pixel array 32, N (N>1) pixel columns are defined as one block BL, and all the pixels 31 arranged two-dimensionally are divided into a plurality of blocks BL. The example in FIG. 7 shows an example in which N=3, and three pixel columns form one block BL.

Each block BL in the pixel array 32 is further divided into two kinds of units (phase control unit blocks) for controlling phases. Where the respective phase control unit blocks of the two kinds are blocks BL_X and blocks BL_Y, the blocks BL_X and the blocks BL_Y are alternately arranged in the horizontal direction (row direction), as shown in FIG. 7.

The light receiving unit 15 further includes a pulse generation circuit 71 and a controller (a control circuit) 72, in addition to the pixel array 32 and the drive control circuit 33.

The drive control circuit 33 includes two phase shift circuits 81 and two or more block drive units 82. Note that the pulse generation circuit 71 and/or the controller 72 may be formed as part of the drive control circuit 33.

In FIG. 7, of the two phase shift circuits 81, the phase shift circuit 81 associated with the blocks BL_X is shown as a phase shift circuit 81X, and the phase shift circuit 81 associated with the blocks BL_Y is shown as a phase shift circuit 81Y. Likewise, of the two or more block drive units 82, the block drive units 82 associated with the blocks BL_X are shown as block drive units 82X, and the block drive units 82 associated with the blocks BL_Y are shown as block drive units 82Y.

The pulse generation circuit 71 generates a drive pulse signal on the basis of a light emission control signal of a predetermined frequency (such as 200 MHz, for example) supplied from the light emission control unit 14, and supplies the drive pulse signal to the phase shift circuits 81X and 81Y.

More specifically, the pulse generation circuit 71 generates a drive pulse signal synchronized with the frequency of the light emission control signal from the light emission control unit 14. The pulse generation circuit 71 also shifts the phase of the frequency-synchronized drive pulse signal with reference to the irradiation timing of the irradiation light described in FIG. 4, and supplies the drive pulse signal to the phase shift circuits 81X and 81Y. The drive pulse signal output from the pulse generation circuit 71 corresponds to the distribution signals DIMIX_A and DIMIX_B described above with reference to FIG. 4 and others.

The controller 72 controls the phase change timing of the phase shift circuits 81X and 81Y. That is, the controller 72 instructs the phase shift circuits 81X and 81Y to change phases.

The phase shift circuits 81X and 81Y perform a process of shifting the phase of the drive pulse signal supplied from the pulse generation circuit 71 as necessary, and supply the drive pulse signal after the phase shift (a phase-shifted drive pulse signal) to the block drive units 82. The phase shift circuits 81X and 81Y generate the drive pulse signal shifted to a plurality of phases in a time division manner within one frame period, so that the irradiation light emitted with a rectangular wave approximates a sine wave (conversion to pseudo sine).

Specifically, the phase shift circuits 81X and 81Y perform a process of shifting the phase of the drive pulse signal supplied from the pulse generation circuit 71 by 0°, 45°, or 90° within one frame period in a predetermined order, and supply the shifted drive pulse signal to the block drive units 82. Note that, in the case of a shift of 0°, the drive pulse signal supplied from the pulse generation circuit 71 may be supplied as it is to the block drive units 82.

The controller 72 informs each of the phase shift circuits 81X and 81Y of the timing to change the phase to be shifted. The phase shift circuits 81X and 81Y change the phase to be shifted at the timing designated through the controller 72.

A block drive unit 82X performs control to supply the drive pulse signal supplied from the phase shift circuit 81X, which is the phase-shifted distribution signals DIMIX_A and DIMIX_B, to each pixel 31 in the corresponding block BL_X, and distribute the electric charges generated by the photodiode 51 to the first tap 52A or the second tap 52B.

A block drive unit 82Y performs control to supply the drive pulse signal supplied from the phase shift circuit 81Y, which is the phase-shifted distribution signals DIMIX_A and DIMIX_B, to each pixel 31 in the corresponding block BL_Y, and distribute the electric charges generated by the photodiode 51 to the first tap 52A or the second tap 52B.

Figure 8:
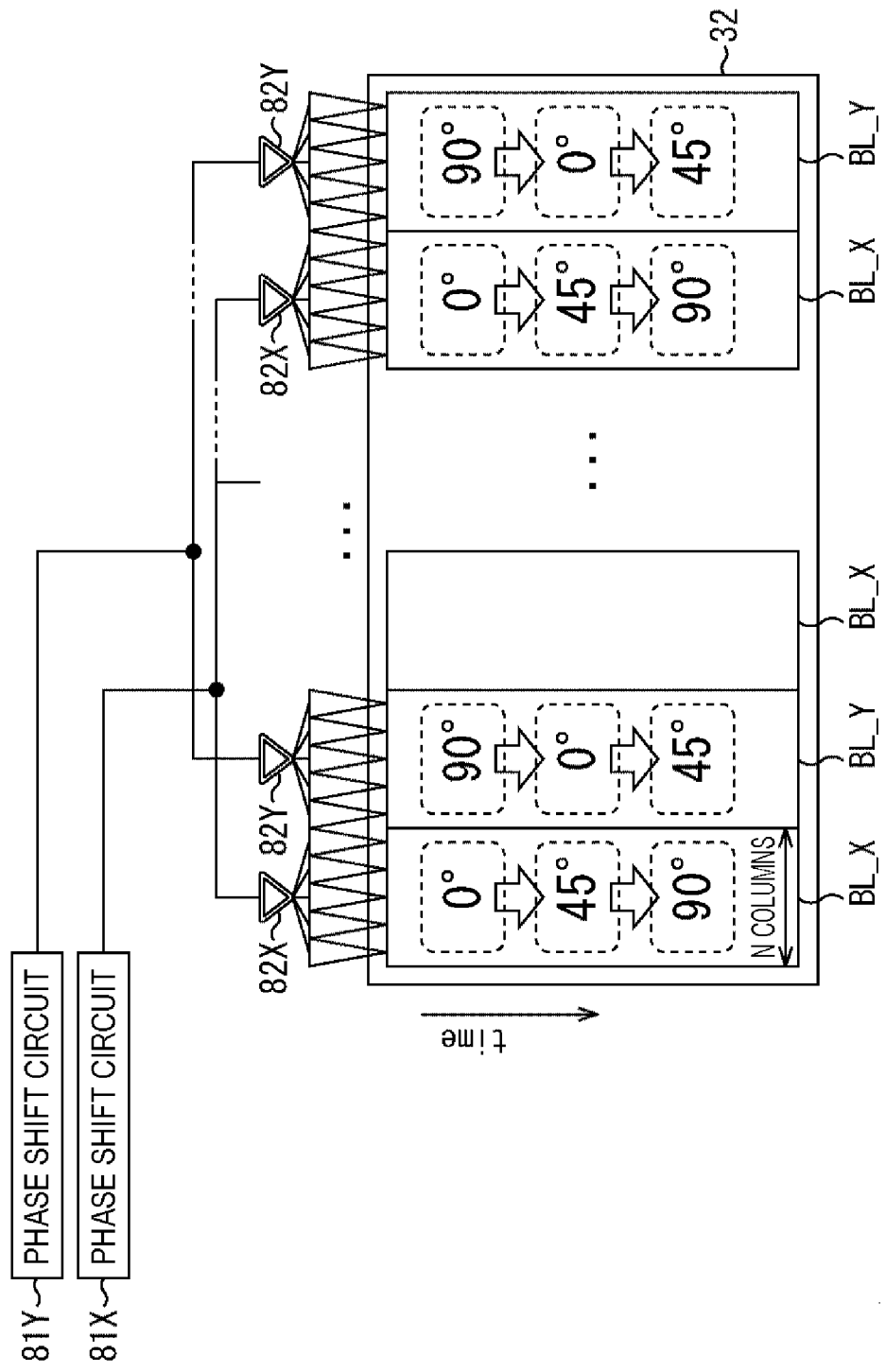
FIG. 8 is a diagram for explaining phase shift processes.

FIG. 8 is a diagram for explaining phase shift processes to be performed by the phase shift circuits 81X and 81Y.

The vertical direction in the blocks BL_X and BL_Y in FIG. 8 indicates the time axis within one frame period.

The phase shift circuit 81X starts from the phase 0°, shifts the phase in the order of 45° and 90° at predetermined time intervals in accordance with a timing instruction from the controller 72, and outputs the result. After the phase 90°, the phase returns to the phase 0°, and the phase shift process is repeated in the order of 0°, 45°, and 90° until the exposure is completed.

On the other hand, the phase shift circuit 81Y starts from the phase 90°, shifts the phase in the order of 0° and 45° at predetermined time intervals in accordance with a timing instruction from the controller 72, and outputs the result. After the phase 45°, the phase returns to the phase 90°, and the phase shift process is repeated in the order of 90°, 0°, and 45° until the exposure is completed.

Figure 9:
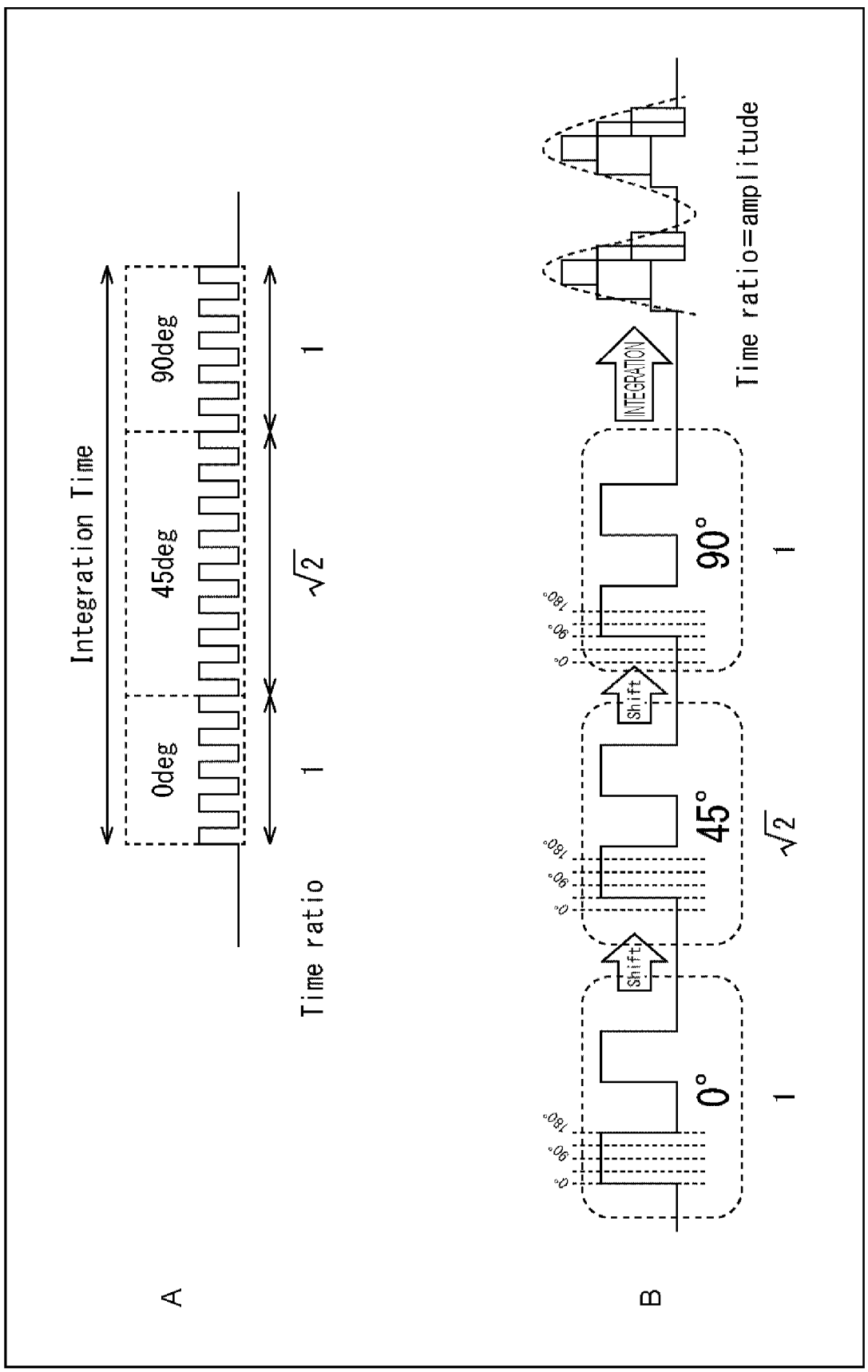
FIG. 9 is a diagram for explaining the charge accumulation times in the respective phases.

FIG. 9 shows the charge accumulation times (integration times) in the respective phases 0°, 45°, and 90°.

As shown in A of FIG. 9, the controller 72 instructs a phase shift circuit 81 to change phases at such timing that the ratio among the period in which the phase shift circuit 81 generates a drive pulse signal subjected to a phase shift of 0°, the period in which the phase shift circuit 81 generates a drive pulse signal subjected to a phase shift of 45°, and the period in which the phase shift circuit 81 generates a drive pulse signal subjected to a phase shift of 90° is $1:\sqrt{2}:1$. Accordingly, the ratio among the charge accumulation times in the respective phases 0°, 45°, and 90° is $1:\sqrt{2}:1$.

As the ratio among the charge accumulation times in the respective phases 0°, 45°, and 90° is $1:\sqrt{2}:1$, the waveform of the modulation wave can approximate a sine wave as shown in B of FIG. 9. By adjusting the ratio among the charge accumulation times, it is possible to adjust the amplitude of a sine wave.

To cause the rectangular waveform light output from the light emitting unit 12 to approximate a sine wave, the light emission timing of the light source may be shifted in phase to achieve conversion to pseudo sine, as disclosed in Patent Document 1. However, it is also possible to achieve conversion to pseudo sine by performing a phase shift on the light receiving timing at the light receiving side as shown in FIG. 9.

Figure 10:
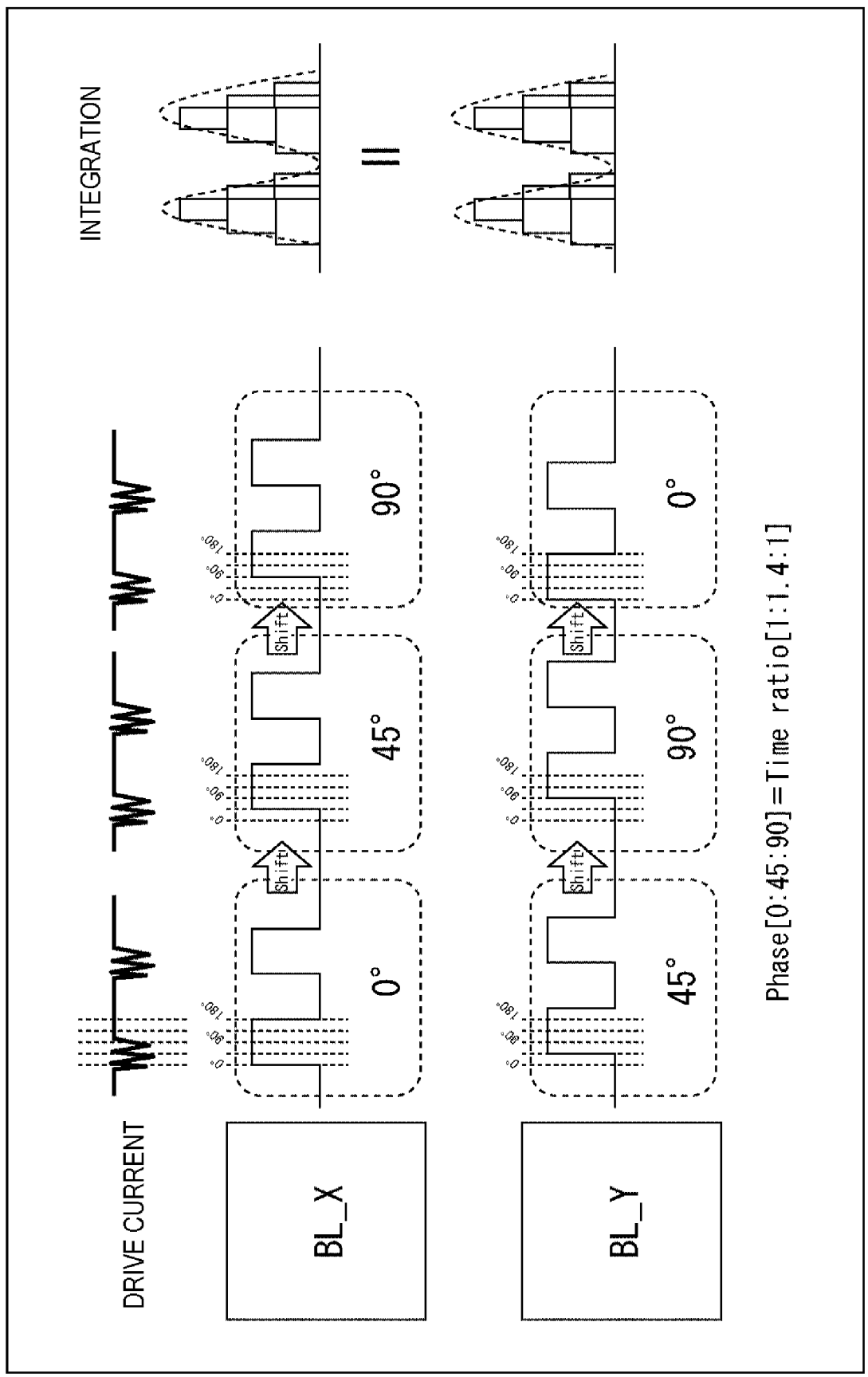
FIG. 10 is a diagram for explaining the phase shift control in the respective blocks.

FIG. 10 illustrates the phase shift control in each of a block BL_X and a block BL_Y.

The drive control circuit 33 divides all the pixels in the pixel array 32 into two phase control unit blocks that are a block BL_X and a block BL_Y, and causes the block BL_X and the block BL_Y to accumulate electric charges in different phases, as shown in FIG. 10. As a result, the current for driving the pixels 31 is dispersed in the entire pixel array 32. Accordingly, a decrease in the IR drop can be prevented, and degradation of EMC and EMI can also be prevented.

Also, on the basis of the timing control by the controller 72, the phase shift circuit 81 performs control so that the ratio among the charge accumulation times in the respective phases 0°, 45°, and 90° becomes 1:√2:1. Thus, the modulation wave of the received light can approximate a sine wave, and cyclic errors can be reduced.

Since the integration results of the respective pixels arranged in the block BL_X and the block BL_Y are the same, the pixel data (detection signals A and B) output from the respective pixels do not require any special correction process such as a correction process for canceling an offset or the like in the plane (in the area) of the pixel array 32.

Accordingly, with the ranging sensor 13, it is possible to perform drive to achieve both reduction of cyclic errors and dispersion of the drive current. Furthermore, pixel data (the detection signals A and B) similar to that in a case where any phase shift is not performed can be acquired.

<Example in which the Phase Control Division Number is Three>

In the example shown in FIGS. 7 to 10, all the pixels in the pixel array 32 are divided into two blocks BL_X and BL_Y as phase control unit blocks. However, the pixels may be divided into three or more phase control unit blocks.

Figure 11:
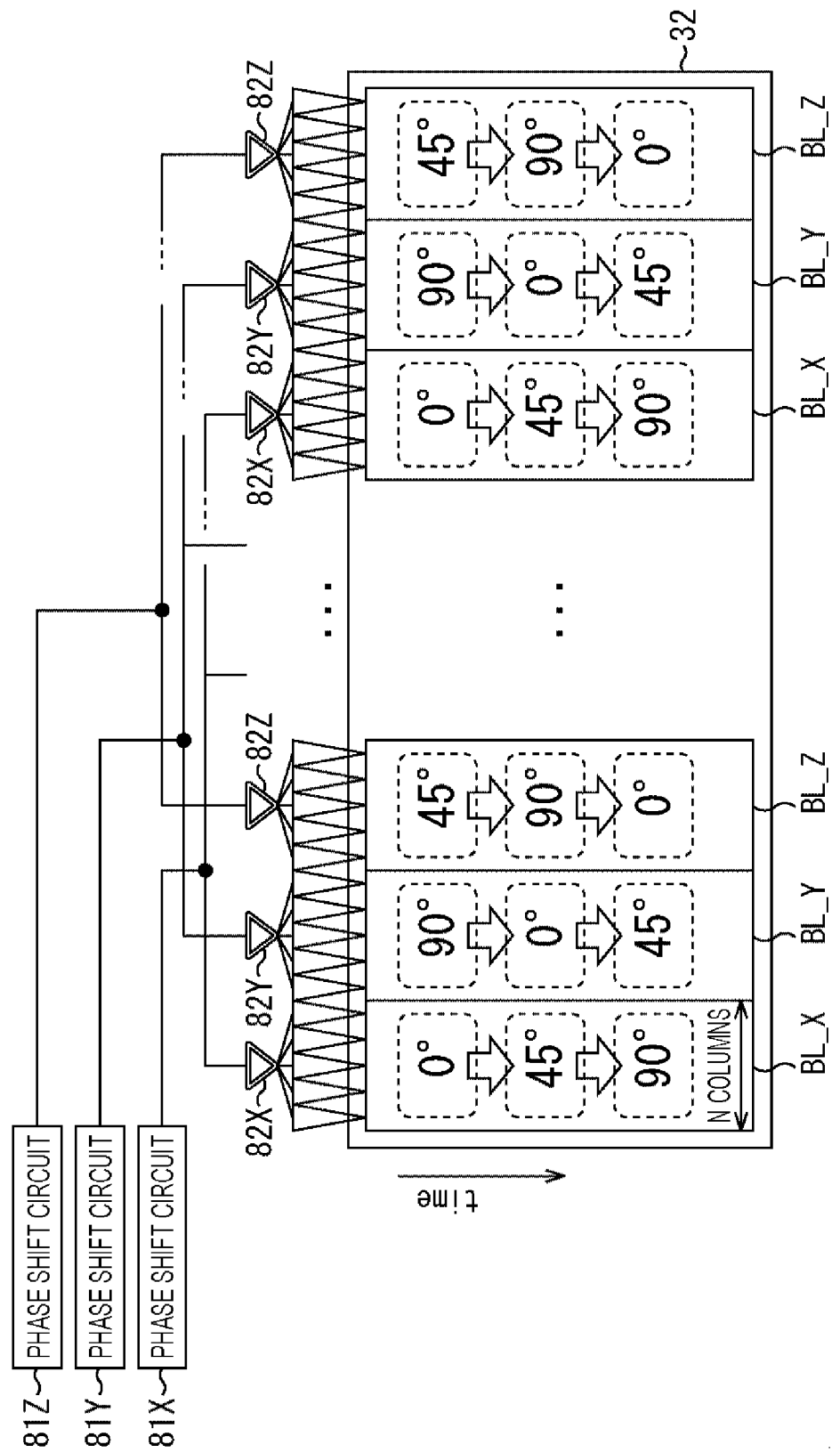
FIG. 11 is a diagram showing a schematic example configuration in which the phase control division number is three.

FIG. 11 is a diagram showing a schematic example configuration of the pixel array 32 and the drive control circuit 33 corresponding to FIG. 8 in a case where the phase control unit blocks are divided into three kinds.

In FIG. 11, each of the blocks BL divided into units of N columns in the pixel array 32 is divided into three kinds of blocks BL_X, BL_Y, and BL_Z.

In this case, the drive control circuit 33 includes three phase shift circuits 81 and three or more block drive units 82.

Of the three phase shift circuits 81, the phase shift circuits 81 associated with the blocks BL_X, BL_Y, and BL_Z are shown as phase shift circuits 81X, 81Y, and 81Z, respectively. Likewise, of the three or more block drive units 82, the block drive units 82 associated with the blocks BL_X, BL_Y, and BL_Z are shown as block drive units 82X, 82Y, and 82Z, respectively.

The phase shift circuit 81X changes the phase of the drive pulse signal supplied from the pulse generation circuit 71 in accordance with a timing instruction from the controller 72, and supplies the drive pulse signal to the block drive unit 82X. The phase shift circuit 81X starts from the phase 0°, shifts the phase in the order of 45° and 90° at predetermined time intervals, and outputs the result. After the phase 90°, the phase returns to the phase 0°.

The phase shift circuit 81Y changes the phase of the drive pulse signal supplied from the pulse generation circuit 71 in accordance with a timing instruction from the controller 72, and supplies the drive pulse signal to the block drive unit 82Y. The phase shift circuit 81Y starts from the phase 90°, shifts the phase in the order of 0° and 45° at predetermined time intervals in accordance with a timing instruction from the controller 72, and outputs the result. After the phase 45°, the phase returns to the phase 90°.

The phase shift circuit 81Z changes the phase of the drive pulse signal supplied from the pulse generation circuit 71 in accordance with a timing instruction from the controller 72, and supplies the drive pulse signal to the block drive unit 82Z. The phase shift circuit 81Z starts from the phase 45°, shifts the phase in the order of 90° and 0° at predetermined time intervals in accordance with a timing instruction from the controller 72, and outputs the result. After the phase 0°, the phase returns to the phase 45°.

Figure 12:
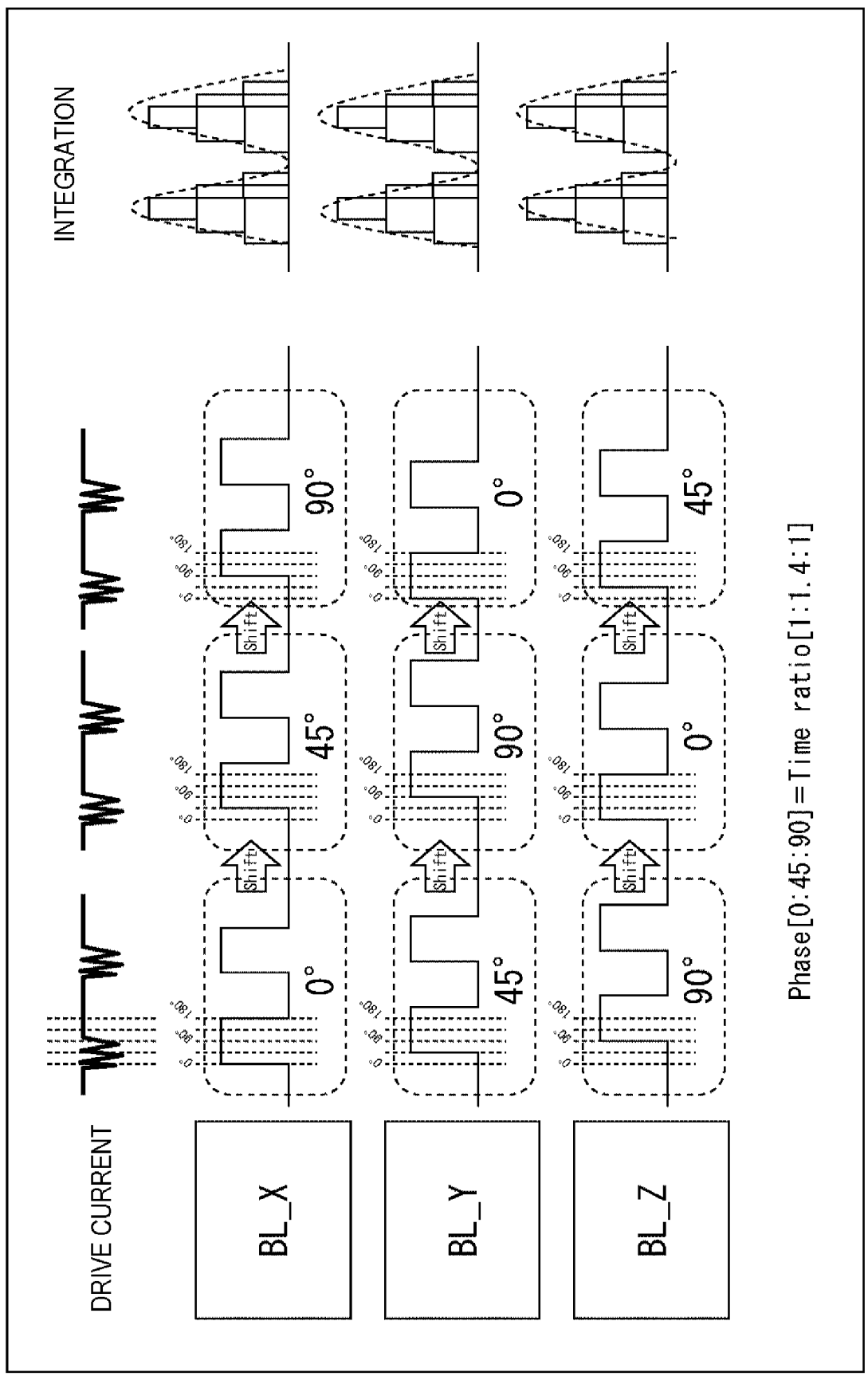
FIG. 12 is a diagram for explaining the phase shift control in the respective blocks in which the phase control division number is three.

FIG. 12 illustrates the phase shift control in each of the blocks BL_X, BL_Y, and BL_Z.

The drive control circuit 33 divides all the pixels in the pixel array 32 into three phase control unit blocks that are blocks BL_X, BL_Y, and BL_Z, and causes the blocks BL_X, BL_Y, and BL_Z to accumulate electric charges in different phases, as shown in FIG. 12. As a result, the current for driving the pixels 31 is dispersed in the entire pixel array 32. Accordingly, a decrease in the IR drop can be prevented, and degradation of EMC and EMI can also be prevented.

Also, on the basis of the timing control by the controller 72, the phase shift circuit 81 performs control so that the ratio among the charge accumulation times in the respective phases 0°, 45°, and 90° becomes 1:√2:1. Thus, the modulation wave of the received light can approximate a sine wave, and cyclic errors can be reduced.

Since the integration results of the respective pixels arranged in the blocks BL_X, BL_Y, and BL_Z are the same, the pixel data (detection signals A and B) output from the respective pixels do not require any special correction process such as a correction process for canceling an offset or the like in the plane (in the area) of the pixel array 32.

<Method for Dividing Blocks in the Pixel Array>

In the examples described above, N (N>1) pixel columns are defined as one block BL, and the pixel array 32 is divided into a plurality of blocks BL in the row direction. However, the block division method for dividing the pixel array 32 into a plurality of blocks BL is not limited to that.

Figure 13:
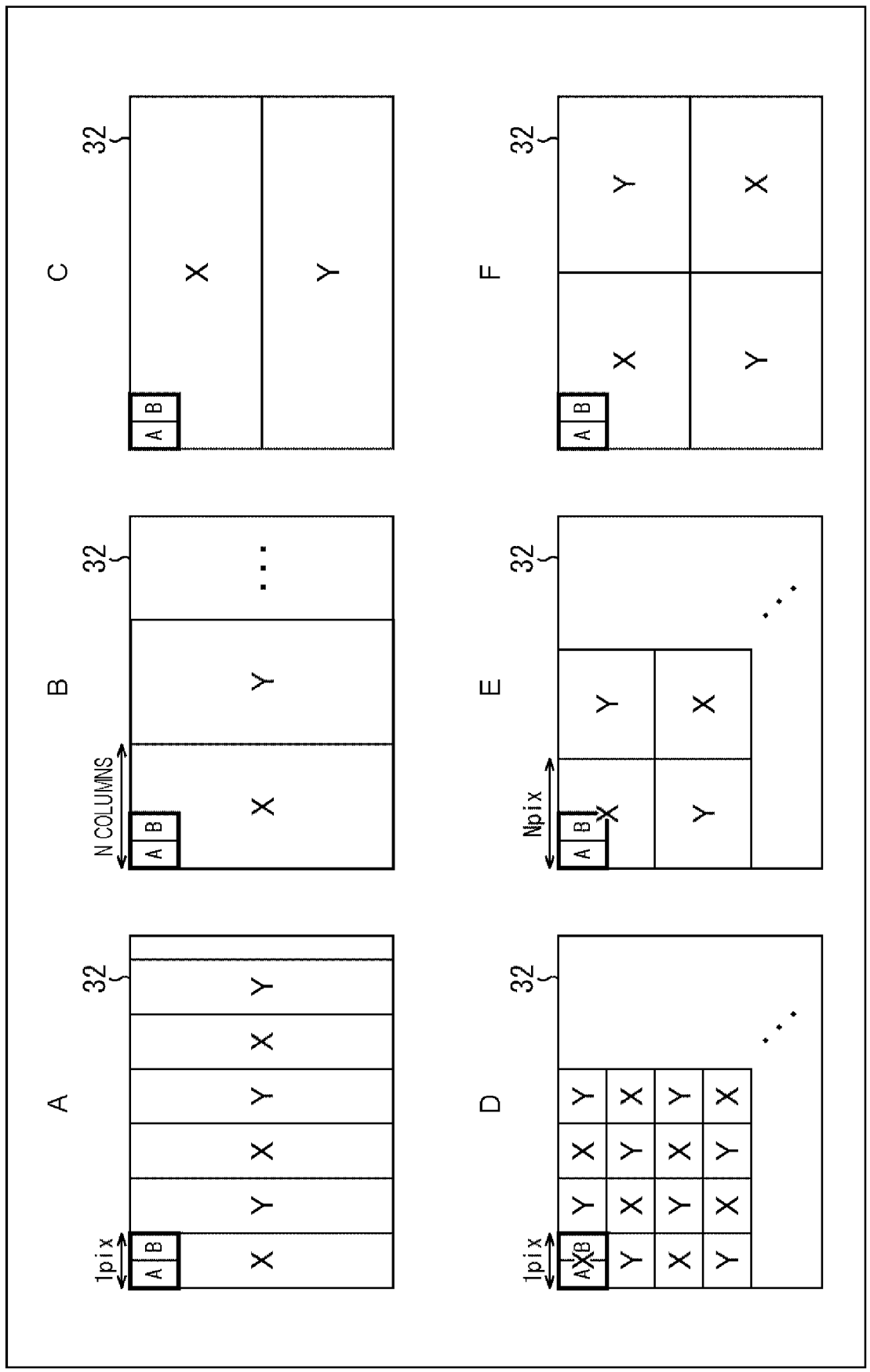
FIG. 13 is a diagram for explaining a method of dividing the blocks in the pixel array.

FIG. 13 shows various kinds of examples of block division methods in a case where the pixel array 32 is divided into phase control unit blocks of the two kinds: blocks BL_X and blocks BL_Y.

Note that, in FIG. 13, a region in which "X" is written represents a block BL_X, and a region in which "Y" is written represents a block BL_Y.

B of FIG. 13 illustrates a block division method by which the pixel array 32 is divided into a plurality of blocks BL in the row direction, with N pixel columns being one block BL, which is the same as in the examples described above.

A of FIG. 13 illustrates a block division method by which the pixel array 32 is divided into a plurality of blocks BL in the row direction (horizontal direction), with one pixel column being one block BL.

C of FIG. 13 illustrates a block division method by which the pixel array 32 is divided into two blocks BL in a north-south direction, where the vertical direction of the rectangular region of the entire pixel array 32 is defined as the north-south direction, and the horizontal direction is defined as an east-west direction. In a case where a block BL_X and a block BL_Y are divided into two and arranged in the north-south direction, the phase shift circuits 81 and the block drive units 82 may also be dispersedly located in accordance with the blocks BL to be controlled. For example, the phase shift circuit 81X and the block drive unit 82X that control the pixels 31 in the block BL_X disposed on the north side (the upper side in C of FIG. 13) can be disposed on the north side of the pixel array 32, and the phase shift circuit 81Y and the block drive unit 82Y that control the pixels 31 in the block BL_Y disposed on the south side (the lower side in C of FIG. 13) can be disposed on the south side of the pixel array 32.

E of FIG. 13 illustrates a block division method by which the pixel array is divided so that blocks BL_X and blocks BL_Y are alternately arranged in the horizontal and vertical directions in a checkered pattern, each one block BL being a region formed with N pixels in each of the horizontal and vertical directions.

D of FIG. 13 illustrates a block division method by which the pixel array is divided so that blocks BL_X and blocks BL_Y are alternately arranged in the horizontal and vertical directions in a checkered pattern, each one block BL being a region formed with one pixel.

F of FIG. 13 illustrates a block division method by which the rectangular region of the entire pixel array 32 is divided into two blocks BL in each of the east-west and north-south directions. In this case, the entire pixel array 32 is divided into four (2×2) blocks BL, and blocks BL_X and blocks BL_Y are arranged in a checkered pattern. The phase shift circuits 81 and the block drive units 82 may be divided and disposed at two locations in the north-south direction of the pixel array 32 as in C of FIG. 13, or may be divided and disposed at four locations in the east-west and north-south directions. As a matter of course, they may be gathered at a location in one of the east-west and north-south directions, as in FIG. 7.

<Detection by an IQ Mosaic>

The plurality of phase shift circuits 81 and the plurality of block drive units 82 described above perform phase shifts for conversion to pseudo sine, and disperse the drive timing block by block, to generate effects such as dispersion of the drive current and reduction of cyclic errors.

However, to output one depth map, the ranging sensor 13 requires four frames according to the 4-phase method, and requires two frames according to the 2-phase method. An increase in the number of pixels in the ranging sensor 13 might cause a decrease in frame rate.

Referring now to FIG. 14, drive to output one depth map for one frame by a modified 2-phase method is described.

By the 2-phase method, in the first frame, a detection signal of the phase 0° is acquired by the first tap 52A of each pixel 31, and a detection signal of the phase 180° is acquired by the second tap 52B, as shown on the left side in FIG. 14. Next, in the second frame, a detection signal of the phase 90° is acquired by the first tap 52A of each pixel 31, and a detection signal of the phase 270° is acquired by the second tap 52B. I and Q in Equation (4), and the depth value d in Equation (1) are then calculated with the use of the four detection signals of the first frame and the second frame.

Where the pixel data of each pixel 31 obtained in the first frame is referred to as the I pixel data of an in-phase component with respect to the light modulation wave, and the pixel data of each pixel 31 obtained in the second frame is referred to as the Q pixel data of a quadrature-phase component with respect to the light modulation wave, the 2-phase method is a method for acquiring the I pixel data from all pixels in the first frame, and acquiring the Q pixel data from all pixels in the second frame.

On the other hand, as shown on the right side in FIG. 14, the pixels 31 for acquiring the I pixel data (these pixels will be hereinafter referred to as the I pixels) and the pixels 31 for acquiring the Q pixel data (there pixels will be hereinafter referred to as the Q pixels) are made to coexist, so that detection signals of all the phases 0°, 90°, 180°, and 270° with respect to the light modulation wave can be acquired from one frame. Thus, I and Q in Equation (4) can be calculated, and the depth value d can be obtained. The drive in which the I pixels and the Q pixels coexist in one frame in this manner is referred to as IQ mosaic drive.

Note that, in the IQ mosaic drive illustrated in FIG. 14, the characteristic variation between the taps present in each pixel cannot be eliminated, as in the above examples using the 2-phase method.

Figure 15:
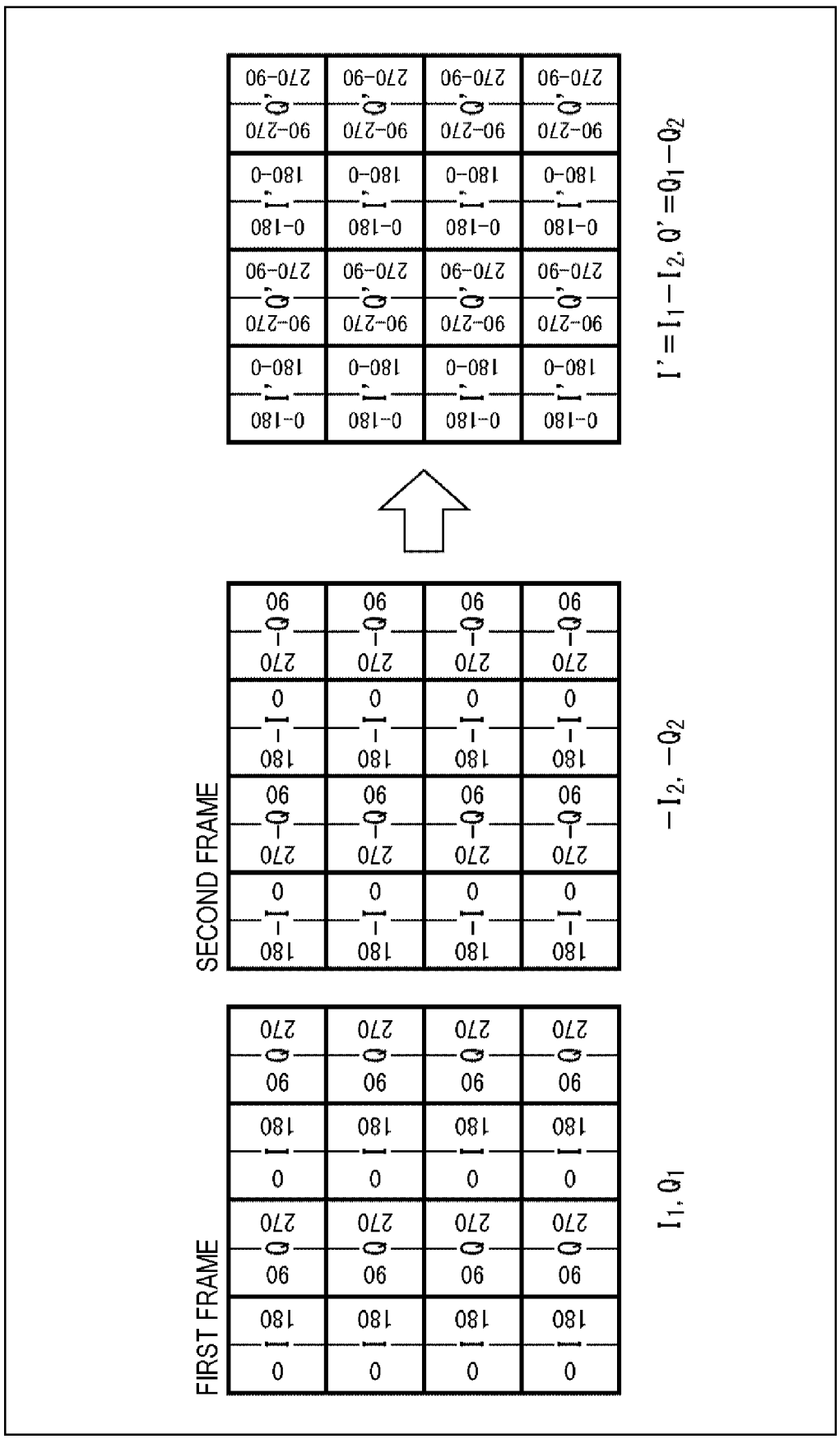
FIG. 15 is a diagram for explaining IQ mosaic drive.

In a case where priority is given to elimination of characteristic variation between the taps present in each pixel, the drive control circuit 33 performs drive similar to the IQ mosaic drive in one frame in FIG. 14 in the first frame, and, in the second frame, performs IQ mosaic drive in which the phases of the first tap 52A and the second tap 52B of each pixel 31 are reversed with respect to the first frame, as shown in FIG. 15. In this case, the pixel data of the first frame and the second frame are used to calculate the difference between detection signals of the opposite phases in the same pixel. In this manner, the characteristic variation between the taps present in each pixel can be removed as in a case with the 4-phase method described above, and the depth value d can be obtained with a smaller number of frames (two frames) than by the 4-phase method.

Note that, in the IQ mosaic drive, the I pixels and the Q pixels are arranged on a pixel column basis in the examples shown in FIGS. 14 and 15. However, arrangement of the I pixels and the Q pixels is not limited to this example. For example, as shown in FIG. 16, the I pixels and the Q pixels may be alternately arranged in both the horizontal and vertical directions in a checkered pattern.

The IQ mosaic drive described above can be adopted as a countermeasure against a decrease in the frame rate due to an increase in the number of pixels in the pixel array 32.

Also, by combining the IQ mosaic drive, the phase shift for conversion to pseudo sine with a plurality of phase shift circuits 81 and a plurality of block drive units 82, and the drive timing dispersion for each block BL, it is possible to simultaneously achieve the frame rate shortening effect and the effects to disperse the drive current and reduce cyclic errors.

<Example of IQ Mosaic Drive in which the Phase Control Division Number is Four>

In the IQ mosaic drive to be described next, all the pixels in the pixel array 32 are divided into four kinds of phase control unit blocks, and I pixels and Q pixels are arranged on a pixel column basis as shown in FIG. 14.

Figure 17:
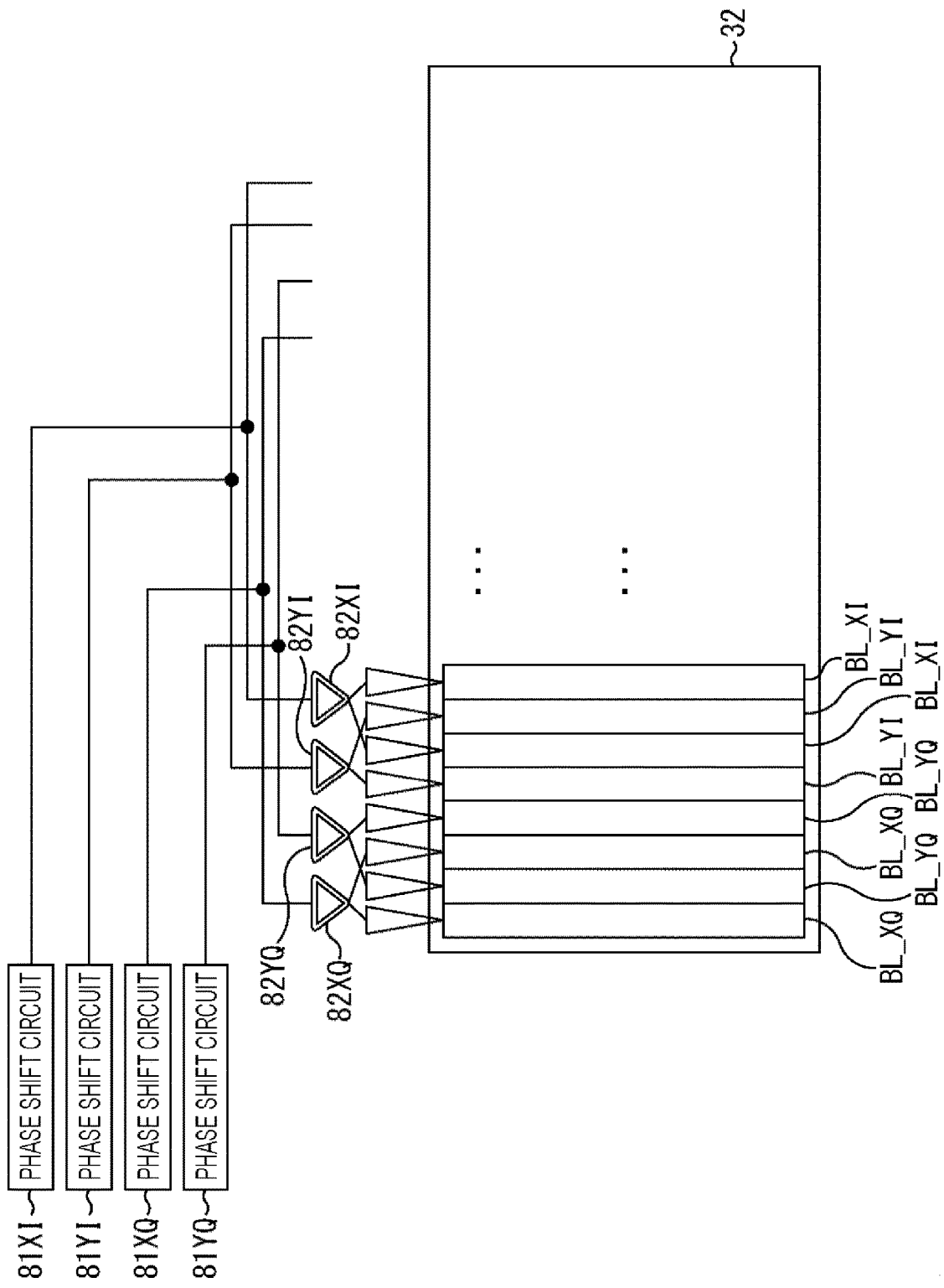
FIG. 17 is a diagram illustrating an example of IQ mosaic drive with a phase control division number of four.

FIG. 17 is a diagram showing a schematic example configuration of the pixel array 32 and the drive control circuit 33 in a case where the pixel array 32 is divided into four kinds of phase control unit blocks, and IQ mosaic drive is performed.

Each of the blocks BL divided into units of N columns in the pixel array 32 is divided into four kinds of blocks BL_XI, BL_YI, BL_XQ, and BL_YQ. The blocks BL_XI and BL_YI are blocks BL including pixels 31 to be driven as I pixels, and the blocks BL_XQ and BL_YQ are blocks BL including pixels 31 to be driven as Q pixels.

The drive control circuit 33 includes four phase shift circuits 81 and four or more block drive units 82.

Of the four phase shift circuits 81, the phase shift circuits 81 associated with the blocks BL_XI, BL_YI, BL_XQ, and BL_YQ are shown as phase shift circuits 81XI, 81YI, 81XQ, and 81YQ, respectively. Likewise, of the four or more block drive units 82, the block drive units 82 associated with the blocks BL_XI, BL_YI, BL_XQ, and BL_YQ are shown as block drive units 82XI, 82YI, 82XQ, and 82YQ, respectively.

Figure 18:
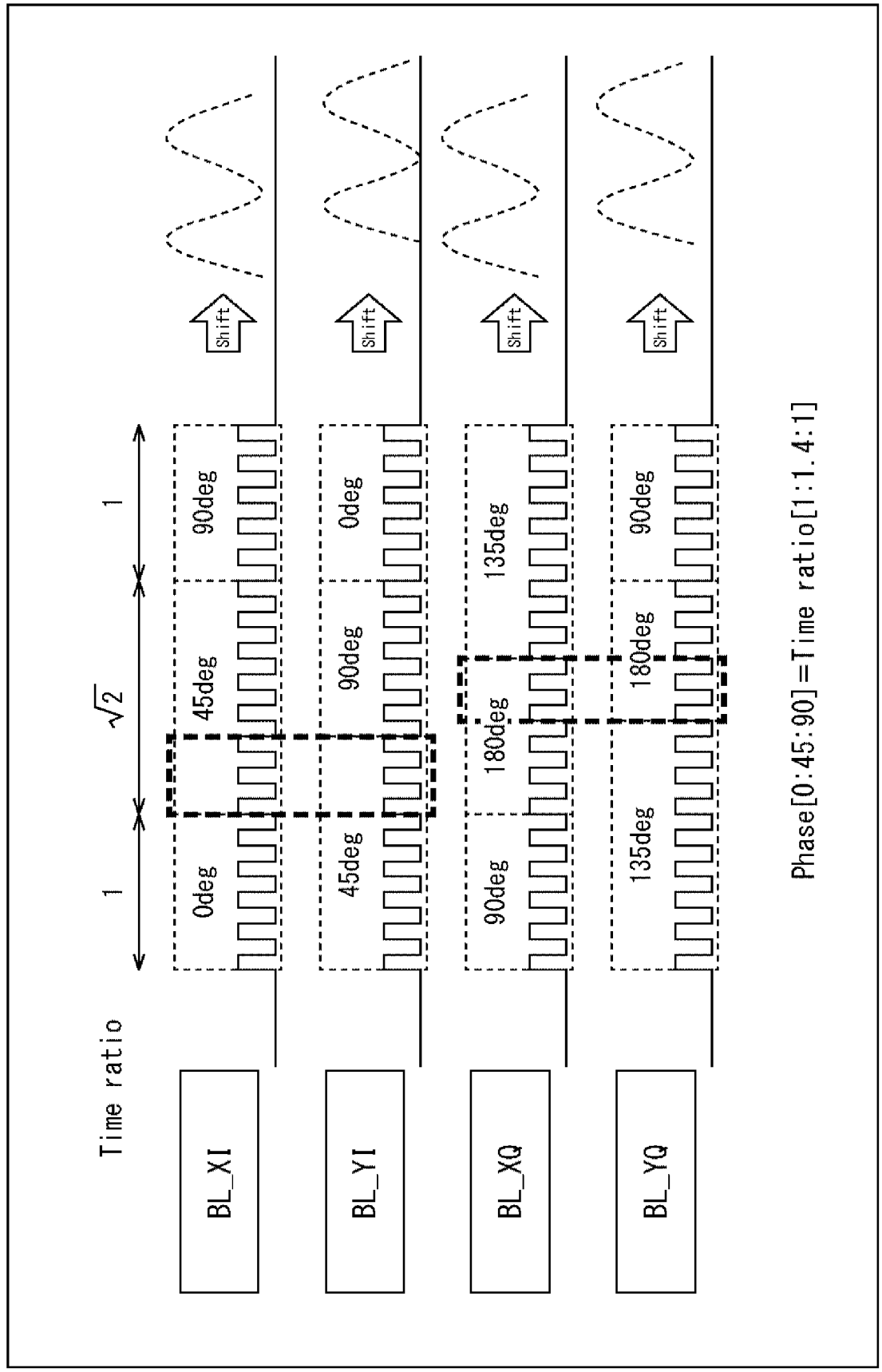
FIG. 18 is a diagram for explaining the phase shift control in the respective blocks.

FIG. 18 illustrates the phase shift control in each of the blocks BL_XI, BL_YI, BL_XQ, and BL_YQ.

The ratio among the charge accumulation times in the phases 0°, 45°, and 90° of each pixel 31 is $1:\sqrt{2}\ (\approx 1.4):1$, as in the example described above. In a case where the phase of an I pixel is 0°, 45°, or 90°, the phase of a Q pixel is 90°, 135°, or 180°, respectively, and the phase of an I pixel and the phase of a Q pixel are in an orthogonal relation.

As can be seen from FIG. 18, where the phase shifts for conversion to pseudo sine are of the three kinds 0°, 45°, and 90° (90°, 135°, and 180° in the Q pixels), and the ratio among the charge accumulation times in the respective phases 0°, 45°, and 90° is 1:√2 (≈1.4):1, the phases are the same between the two blocks BL during part of the periods indicated by dashed lines. In other words, although the phases of the respective blocks BL are different except for those during the periods indicated by the dashed lines, the phases cannot be completely dispersed so that the phases of the respective blocks BL are different in one entire frame period.

Figure 19:
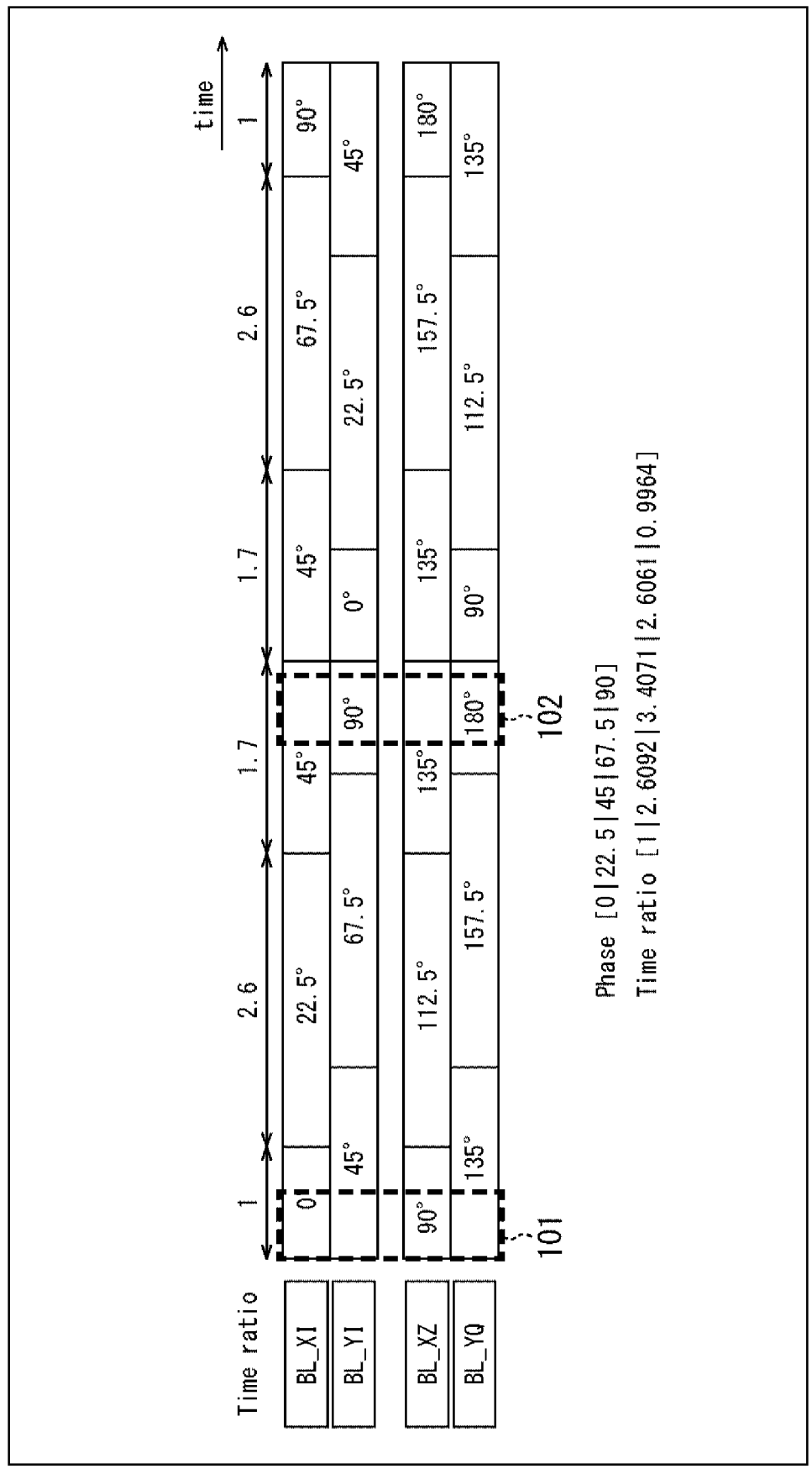
FIG. 19 is a diagram illustrating an example of IQ mosaic drive with a phase control division number of four.

Therefore, the drive control circuit 33 performs the phase shift control illustrated in FIG. 19, to make the phases of the respective phase control unit blocks completely different in one entire frame period.

FIG. 19 is a diagram showing an example of phase shift control by IQ mosaic drive in which the pixel array 32 is divided into four kinds of phase control unit blocks, and the phases of the respective phase control unit blocks are completely different.

The drive control circuit 33 sets five types of phase shifts for conversion to pseudo sine at 0°, 22.5°, 45°, 67.5°, and 90° in increments of 22.5° (90°, 112.5°, 135°, 157.5°, and 180° in the Q pixels), and sets the ratio among the charge accumulation times in the respective phases 0°, 22.5°, 45°, 67.5°, and 90° at 1:2.6092:3.4071:2.6061:0.9964. In this arrangement, phase shift control is performed.

As such control is performed, the phase of each phase control unit block can be in a different state during any period. For example, during a period 101 indicated by a dashed line, the blocks BL_XI, BL_YI, BL_XQ, and BL_YQ are controlled to be in the phases 0°, 45°, 90°, and 135°, respectively. During a period 102 indicated by a dashed line, these blocks are controlled to be in the phases 45°, 90°, 135°, and 180°, respectively.

Figure 20:
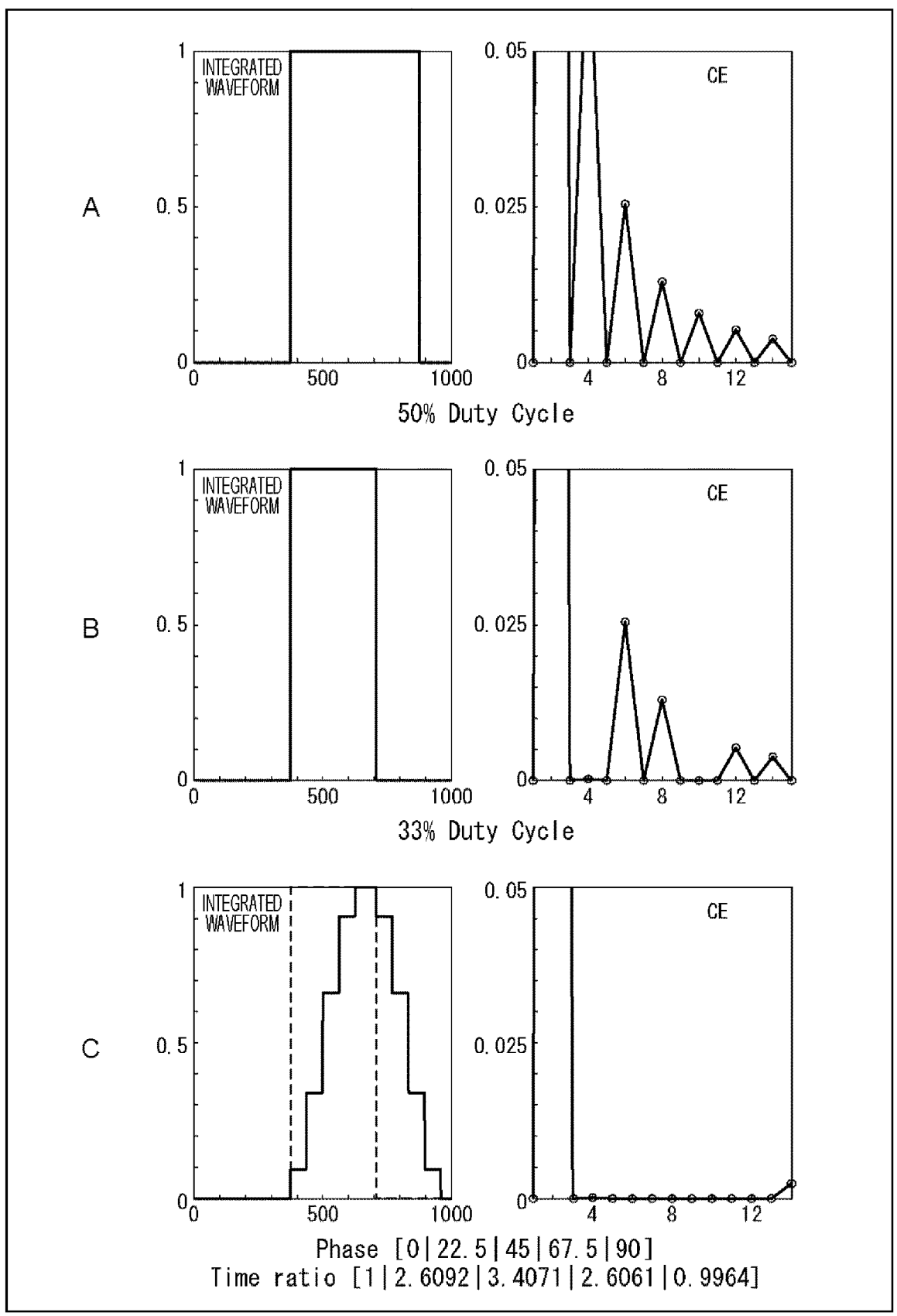
FIG. 20 is a diagram for explaining the effect of cyclic errors caused by conversion to pseudo sine.

FIG. 20 is a diagram showing the results of comparisons between the cyclic errors in exposure control by a rectangular pulse and the cyclic errors in exposure control by the conversion to pseudo sine illustrated in FIG. 19.

A of FIG. 20 is a graph showing the cyclic errors (CE) in exposure control of a rectangular pulse with a duty of 50%, in which the ratio of the "high" time is 50%.

B of FIG. 20 is a graph showing the cyclic errors (CE) in exposure control of a rectangular pulse with a duty of 33%, in which the ratio of the "high" time is 33%.

C of FIG. 20 is a graph showing the cyclic errors (CE) in exposure control by the conversion to pseudo sine illustrated in FIG. 19.

In each of A, B, and C of FIG. 20, the graph on the left side shows the integrated waveform when integration is performed in one frame period, and the graph on the right side shows the cyclic error (ordinate axis) at each frequency (abscissa axis) by FFT.

In the exposure control by the conversion to pseudo sine, the cyclic error is almost zero at the frequencies other than 200 MHz, which is the modulation frequency of the light source, as shown in C of FIG. 20. In the graph showing the FFT result, the values obtained by multiplying the integer value on the abscissa axis by 100 corresponds to the frequencies. On the other hand, in the exposure control of the rectangular pulses in A and B of FIG. 20, a cyclic error occurs at each frequency other than 200 MHz, which is the modulation frequency of the light source, and the cyclic error becomes larger particularly at each frequency that is an integral multiple of 200 MHz.

As described above, through the exposure control by the conversion to pseudo sine illustrated in FIG. 19, the drive timing can be completely dispersed, and cyclic errors can be almost completely eliminated.

Figure 21:
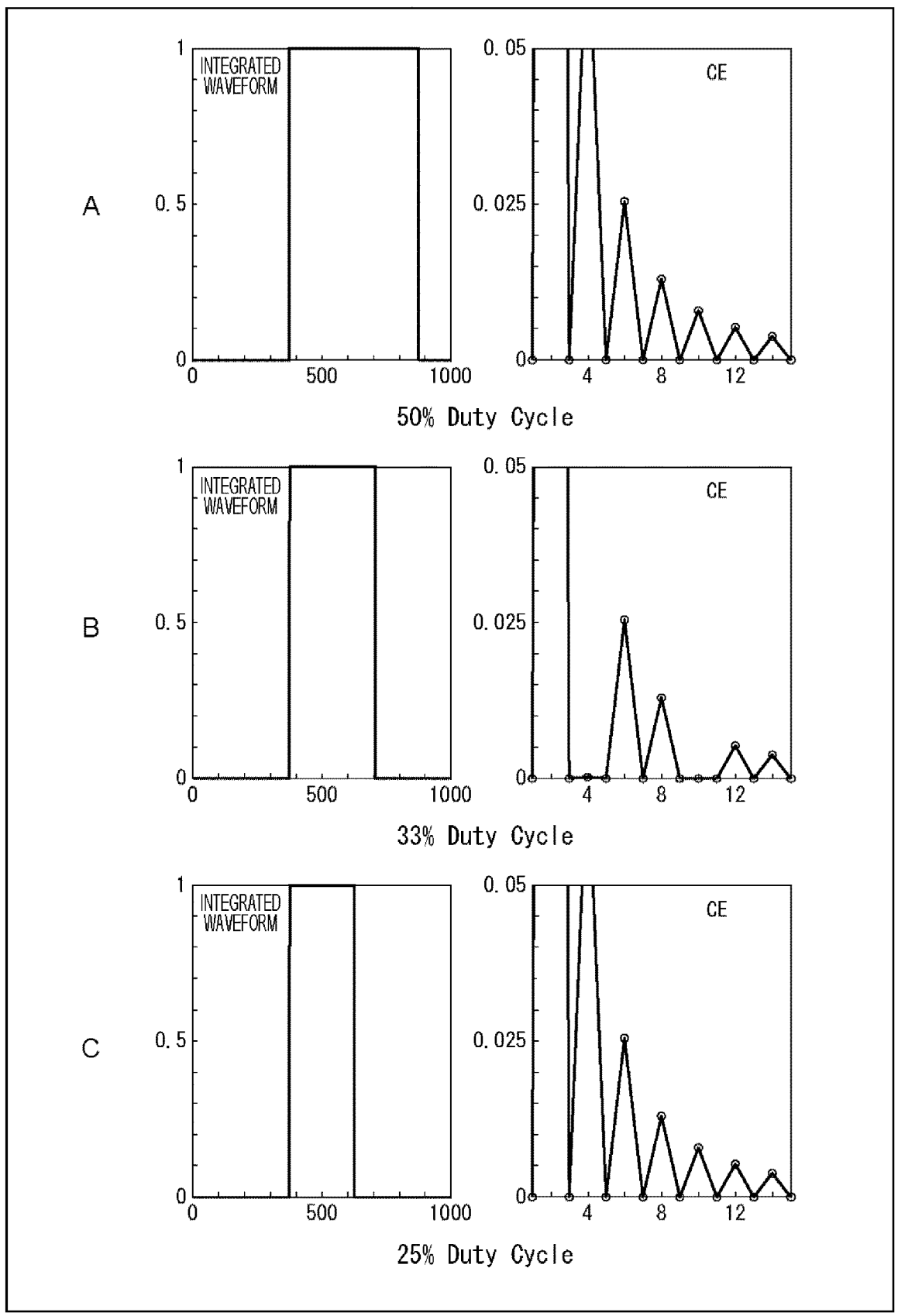
FIG. 21 is a diagram for explaining the effect of cyclic errors caused by conversion to pseudo sine.
Figure 22:
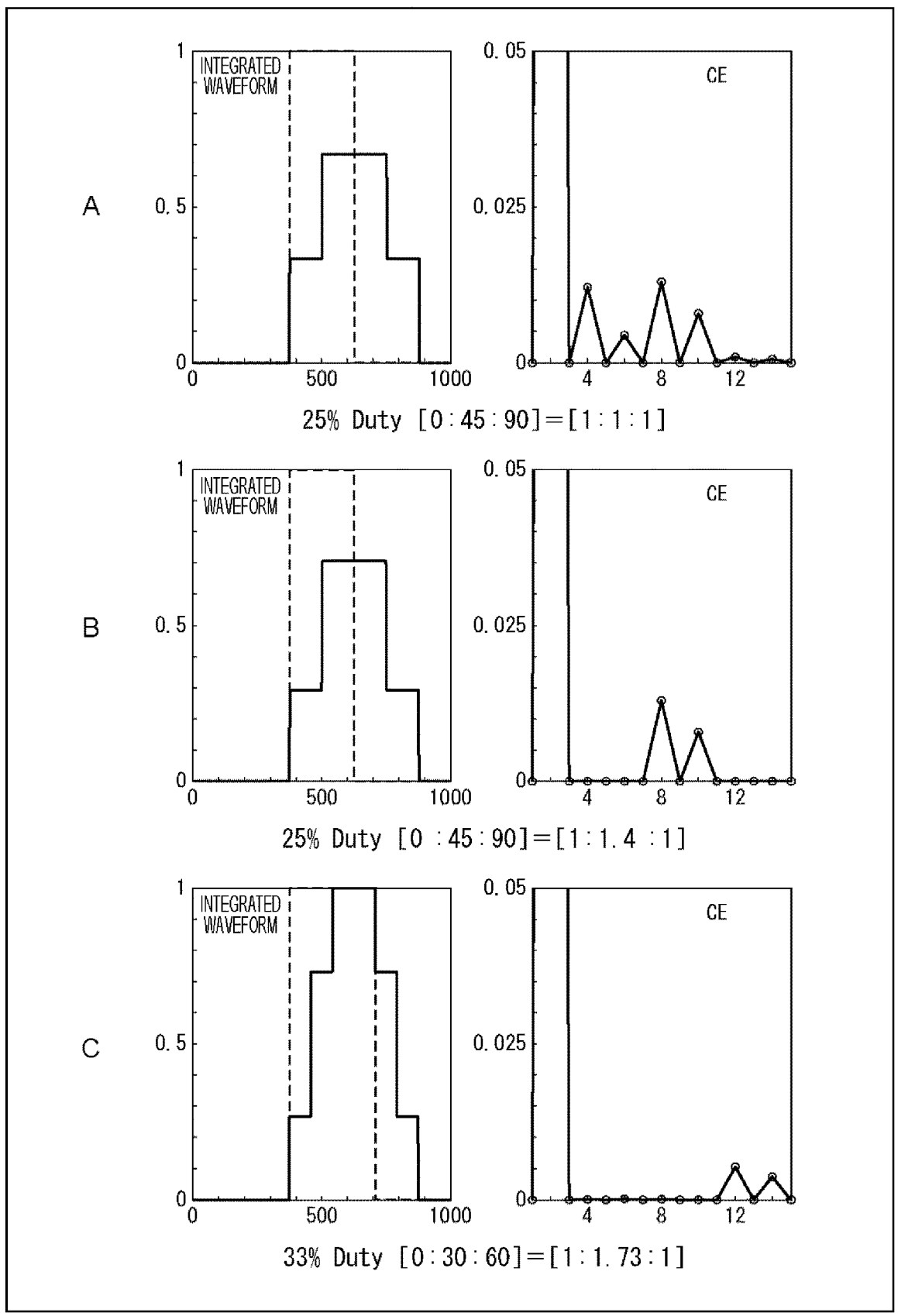
FIG. 22 is a diagram for explaining the effect of cyclic errors caused by conversion to pseudo sine.
Figure 23:
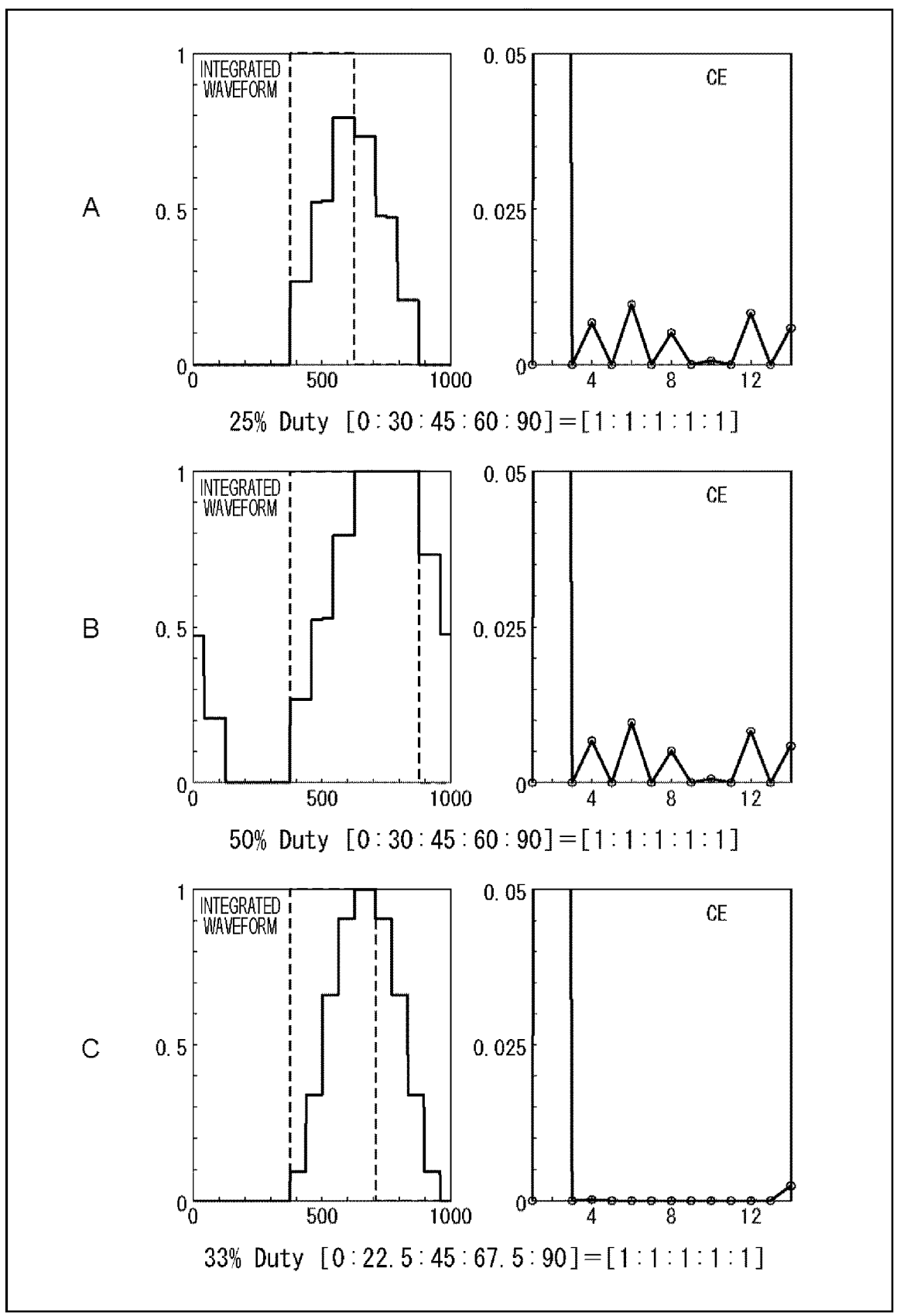
FIG. 23 is a diagram for explaining the effect of cyclic errors caused by conversion to pseudo sine.

FIGS. 21 to 23 show other example combinations of phase shifts for conversion to pseudo sine.

A to C of FIG. 21 show the cyclic error analysis results in a case where any phase shift for conversion to pseudo sine is not performed.

A of FIG. 21 shows the result of analysis of the cyclic errors in exposure control of a rectangular pulse with a duty of 50% in which the ratio of the high time is 50%, B of FIG. 21 shows the result of analysis of the cyclic errors in exposure control of a rectangular pulse with a duty of 33% in which the ratio of the high time is 33%, and C of FIG. 21 shows the result of analysis of the cyclic errors in exposure control of a rectangular pulse with a duty of 25% in which the ratio of the high time is 25%.

A of FIG. 22 shows the result of analysis of the cyclic errors in exposure control performed in a case where a rectangular pulse with a duty of 25% is used, and the ratio among the charge accumulation times in the respective phases 0°, 45°, and 90° (90°, 135°, and 180° in the Q pixels) is 1:1:1.

B of FIG. 22 shows the result of analysis of the cyclic errors in exposure control performed in a case where a rectangular pulse with a duty of 25% is used, and the ratio among the charge accumulation times in the respective phases 0°, 45°, and 90° (90°, 135°, and 180° in the Q pixels) is 1:√2 (≈1.4):1.

C of FIG. 22 shows the result of analysis of the cyclic errors in exposure control performed in a case where a rectangular pulse with a duty of 33% is used, and the ratio among the charge accumulation times in the respective phases 0°, 30°, and 60° (90°, 90°, and 150° in the Q pixels) is 1:√3 (≈1.73):1.

A of FIG. 23 shows the result of analysis of the cyclic errors in exposure control performed in a case where a rectangular pulse with a duty of 25% is used, and the ratio among the charge accumulation times in the respective phases 0°, 30°, 45°, 60°, and 90° (90°, 120°, 135°, 150°, and 180° in the Q pixels) is 1:1:1:1:1.

B of FIG. 23 shows the result of analysis of the cyclic errors in exposure control performed in a case where a rectangular pulse with a duty of 50% is used, and the ratio among the charge accumulation times in the respective phases 0°, 30°, 45°, 60°, and 90° (90°, 120°, 135°, 150°, and 180° in the Q pixels) is 1:1:1:1:1.

C of FIG. 23 shows the result of analysis of the cyclic errors in exposure control performed in a case where a rectangular pulse with a duty of 33% is used, and the ratio among the charge accumulation times in the respective phases 0°, 22.5°, 45°, 67.5°, and 90° (90°, 112.5°, 135°, 157.5°, and 180° in the Q pixels) is 1:1:1:1:1.

The ratios of the charge accumulation times in the respective phases of a plurality of phases may be the same as shown in A to C of FIG. 23, or may be different as shown in B and C of FIG. 22. The number of the kinds of phases to be shifted within one frame period may be plural, but is preferably three or larger.

With the various combinations of phase shifts for the conversion to pseudo sine shown in A of FIG. 22 to C of FIG. 23, cyclic errors can be made smaller than at least those in the exposure control of the rectangular pulse shown in A to C of FIG. 21 without phase shifts.

Among the combinations of phase shifts shown in A of FIG. 22 to C of FIG. 23, the combination of phase shifts shown in C of FIG. 23 can almost completely eliminate cyclic errors.

Figure 24:
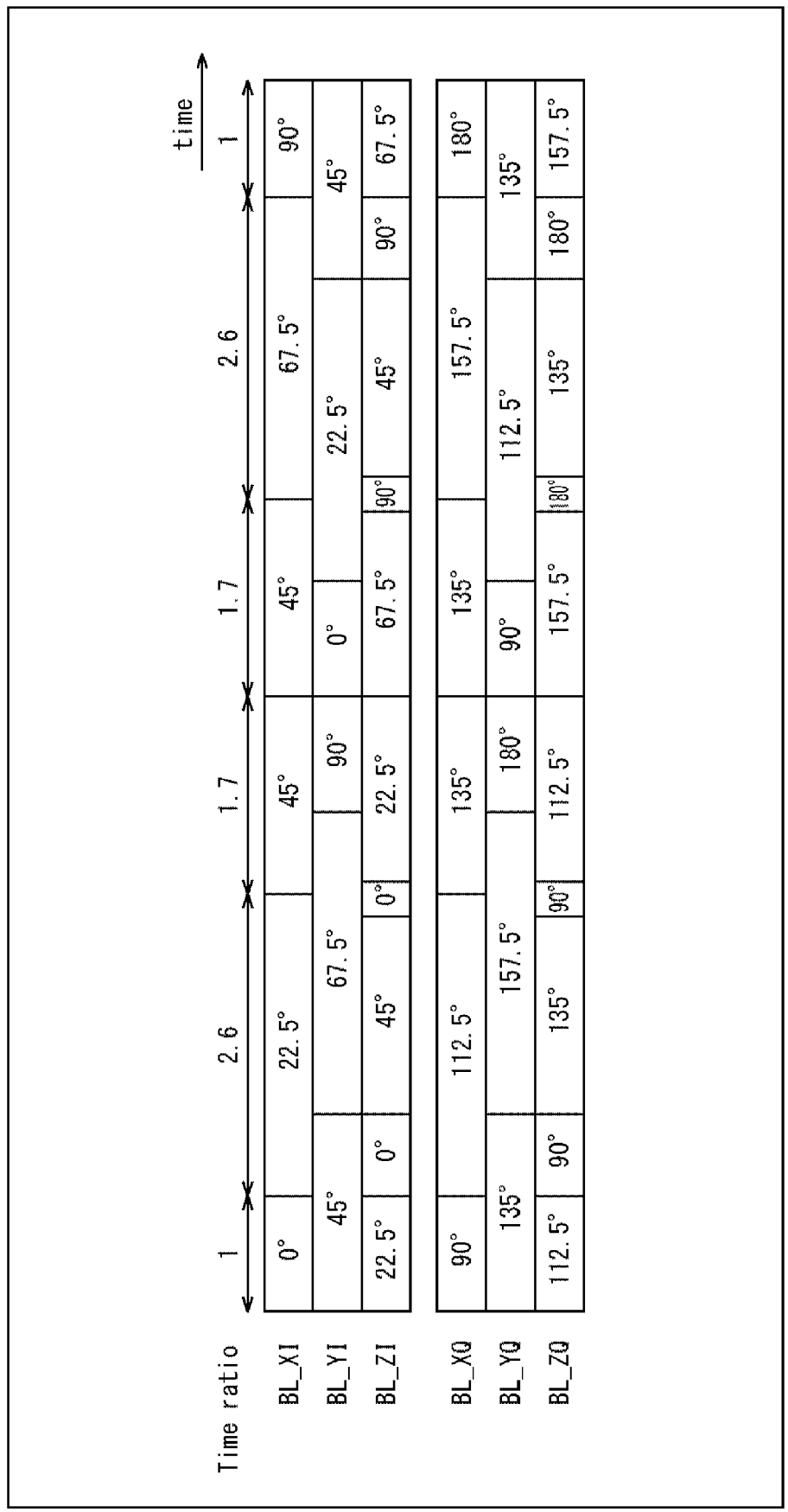
FIG. 24 is a diagram illustrating an example of IQ mosaic drive with a phase control division number of six.

FIG. 24 is a diagram showing an example of phase shift control by IQ mosaic drive in which the pixel array 32 is divided into six kinds of phase control unit blocks, and the phases of the respective phase control unit blocks are completely different.

In the phase shift control illustrated in FIG. 24, the pixel array 32 is divided into six kinds of phase control unit blocks: blocks BL_XI, BL_YI, BL_ZI, BL_XQ, BL_YQ, and BL_ZQ. The blocks BL_XI, BL_YI, and BL_ZI are blocks BL including pixels 31 to be driven as I pixels, and the blocks BL_XQ, BL_YQ, and BL_ZQ are blocks BL including pixels 31 to be driven as Q pixels.

Further, in the phase shift control illustrated in FIG. 24, the combination of phase shifts shown in C of FIG. 23 is adopted.

That is, the drive control circuit 33 sets five kinds of phase shifts for conversion to pseudo sine at 0°, 22.5°, 45°, 67.5°, and 90° (90°, 112.5°, 135°, 157.5°, and 180° in the Q pixels), and sets the ratio among the charge accumulation times in the respective phases 0°, 22.5°, 45°, 67.5°, and 90° at 1:1:1:1:1. In this arrangement, phase shift control is performed.

By such phase shift control, cyclic errors can be almost completely eliminated, as shown in C of FIG. 23.

As described above, with the light receiving unit 15 of the present disclosure, a plurality of phases is switched in a time division manner within one frame period, to turn modulated light into pseudo sine (conversion to pseudo sine). Thus, cyclic errors can be reduced.

The light receiving unit 15 also divides the pixel array 32 into a plurality of phase control unit blocks, and controls the plurality of phase control unit blocks so that the shift amounts of the phase shifts for the conversion to pseudo sine do not become the same as much as possible. Thus, the drive current can be dispersed, and degradation of EMC and EMI can be prevented.

As the phase shifts are performed so that the integration results at the respective pixels arranged in the plurality of phase control unit blocks become the same, the pixel data output from each pixel 31 does not require any special correction process such as a correction process for canceling an offset or the like in the plane (in the area) of the pixel array 32.

<5. Example Chip Configuration of the Ranging Sensor>

Figure 25:
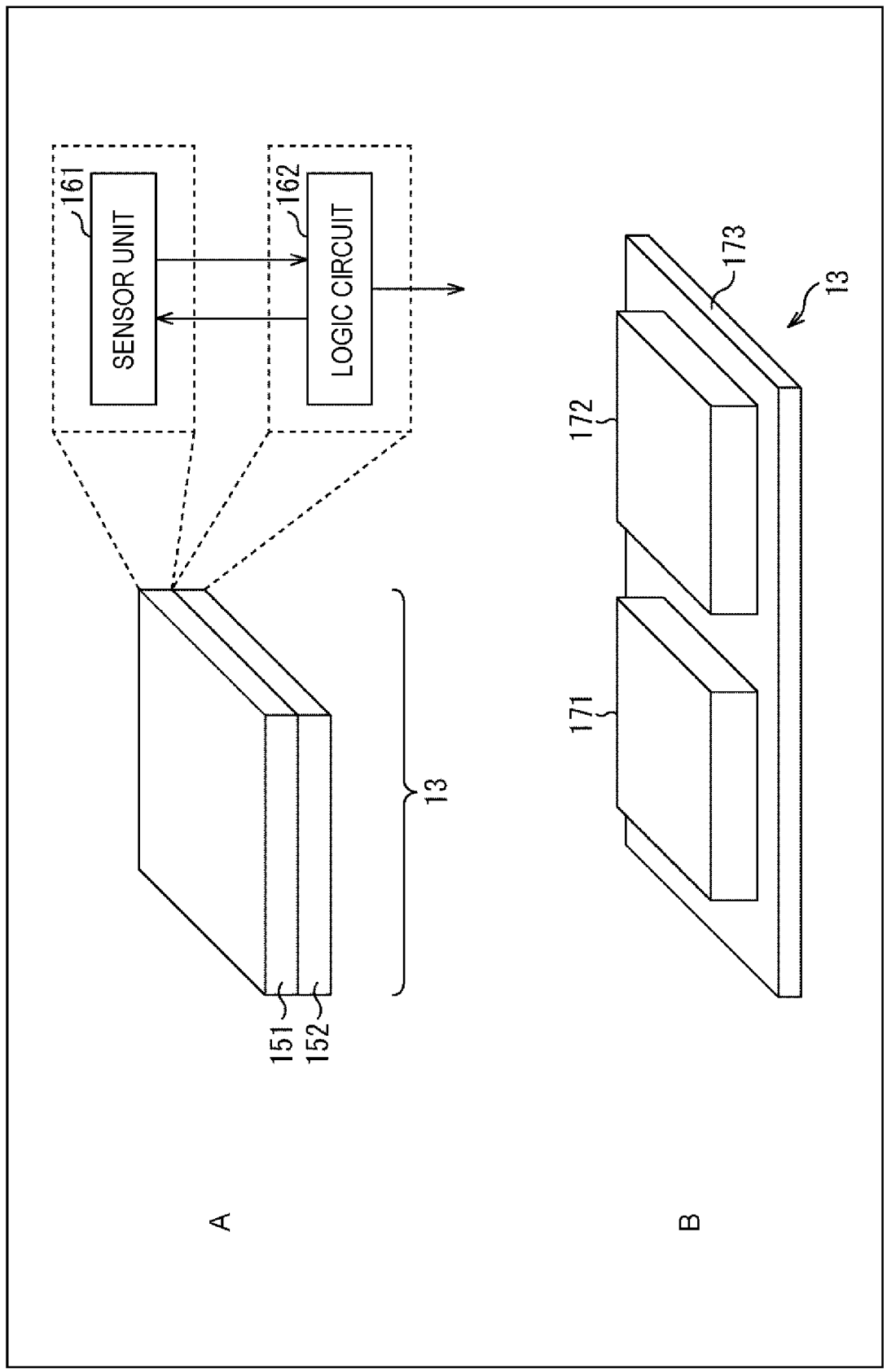
FIG. 25 is a perspective view showing an example chip configuration of a ranging sensor.

FIG. 25 is a perspective view showing an example chip configuration of the ranging sensor 13.

As shown in A of FIG. 25, for example, the ranging sensor 13 can be formed with one chip in which a sensor die 151 and a logic die 152 as a plurality of dies (substrates) are stacked.

A sensor unit 161 (a circuit as a sensor unit) is formed in the sensor die 151, and a logic unit 162 is formed in the logic die 152.

In the sensor unit 161, the pixel array 32 and the drive control circuit 33 are formed, for example. In the logic unit 162, the pulse generation circuit 71, the controller 72, an AD conversion unit that performs AD conversion on a detection signal, the signal processing unit 16, an input/output terminal, and the like are formed, for example.

Also, the ranging sensor 13 may be formed with three layers, another logic die being stacked in addition to the sensor die 151 and the logic die 152. It may of course be formed with a stack of four or more layers of dies (substrates).

Alternatively, as shown in B of FIG. 25, for example, the ranging sensor 13 may be formed with a first chip 171 and a second chip 172, and a relay substrate (an interposer substrate) 173 on which those chips are mounted.

In the first chip 171, the pixel array 32 and the drive control circuit 33 are formed, for example. In the second chip 172, the pulse generation circuit 71, the controller 72, the AD conversion unit that performs AD conversion on a detection signal, the signal processing unit 16, and the like are formed.

Note that the circuit layout of the sensor die 151 and the logic die 152 in A of FIG. 25, and the circuit layout of the first chip 171 and the second chip 172 in B of FIG. 25 described above are merely examples, and circuit layouts are not limited to them. For example, the signal processing unit 16 that performs a depth map generation process and the like may be provided outside the ranging sensor 13 (or in some other chip).

<6. Example Configuration of an Electronic Apparatus>

The ranging module 11 described above can be mounted in an electronic apparatus such as a smartphone, a tablet terminal, a mobile phone, a personal computer, a game machine, a television receiver, a wearable terminal, a digital still camera, or a digital video camera, for example.

Figure 26:
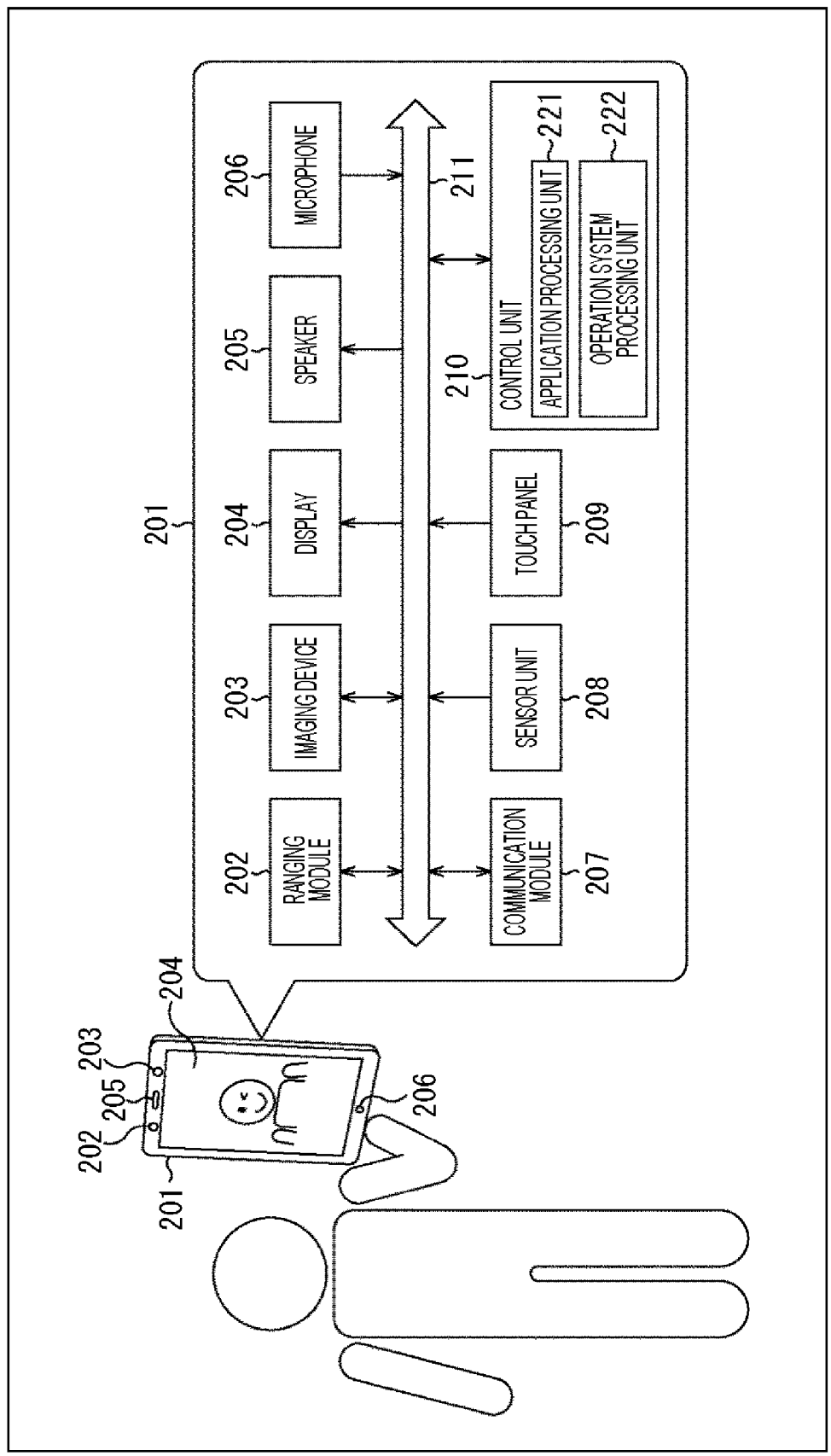
FIG. 26 is a block diagram showing an example configuration of a smartphone as an electronic apparatus equipped with a ranging module.

FIG. 26 is a block diagram showing an example configuration of a smartphone as an electronic apparatus equipped with a ranging module.

As shown in FIG. 26, a smartphone 201 includes a ranging module 202, an imaging device 203, a display 204, a speaker 205, a microphone 206, a communication module 207, a sensor unit 208, a touch panel 209, and a control unit 210, which are connected via a bus 211. Further, in the control unit 210, a CPU executes a program, to achieve functions as an application processing unit 221 and an operation system processing unit 222.

The ranging module 11 FIG. 1 is applied to the ranging module 202. For example, the ranging module 202 is disposed in the front surface of the smartphone 201, and performs ranging for the user of the smartphone 201, to output the depth value of the surface shape of the user's face, hand, finger, or the like as a measurement result.

The imaging device 203 is disposed in the front surface of the smartphone 201, and acquires an image showing the user by performing imaging of the user of the smartphone 201 as the object. Note that, although not shown in the drawing, the imaging device 203 may also be disposed in the back surface of the smartphone 201.

The display 204 displays an operation screen for performing processing with the application processing unit 221 and the operation system processing unit 222, an image captured by the imaging device 203, or the like. The speaker 205 and the microphone 206 output the voice from the other end, and collect the voice of the user, when a voice call is made with the smartphone 201, for example.

The communication module 207 performs communication via a communication network. The sensor unit 208 senses velocity, acceleration, proximity, and the like, and the touch panel 209 acquires a touch operation performed by the user on an operation screen displayed on the display 204.

The application processing unit 221 performs processing for providing various services through the smartphone 201. For example, the application processing unit 221 can perform a process of creating a face by computer graphics that virtually reproduces the user's expression and displaying the face on the display 204, on the basis of the depth supplied from the ranging module 202. The application processing unit 221 can also perform a process of creating three-dimensional shape data of a three-dimensional object, for example, on the basis of the depth supplied from the ranging module 202.

The operation system processing unit 222 performs a process to achieve the basic functions and operations of the smartphone 201. For example, the operation system processing unit 222 can perform a process of authenticating the user's face on the basis of the depth value supplied from the ranging module 202, and releasing the lock on the smartphone 201. Further, the operation system processing unit 222 performs a process of recognizing a gesture of the user on the basis of the depth value supplied from the ranging module 202, and then performs a process of inputting various operations in accordance with the gesture, for example.

In the smartphone 201 designed as described above, the ranging module 11 described above is used, so that a depth map can be generated with high accuracy and at high speed, for example. With this arrangement, the smartphone 201 can detect ranging information more accurately.

<7. Example Applications to Mobile Structures>

The technology (the present technology) according to the present disclosure can be applied to various products. For example, the technology according to the present disclosure may be embodied as a device mounted on any type of mobile structure, such as an automobile, an electrical vehicle, a hybrid electrical vehicle, a motorcycle, a bicycle, a personal mobility device, an airplane, a drone, a vessel, or a robot.

Figure 27:
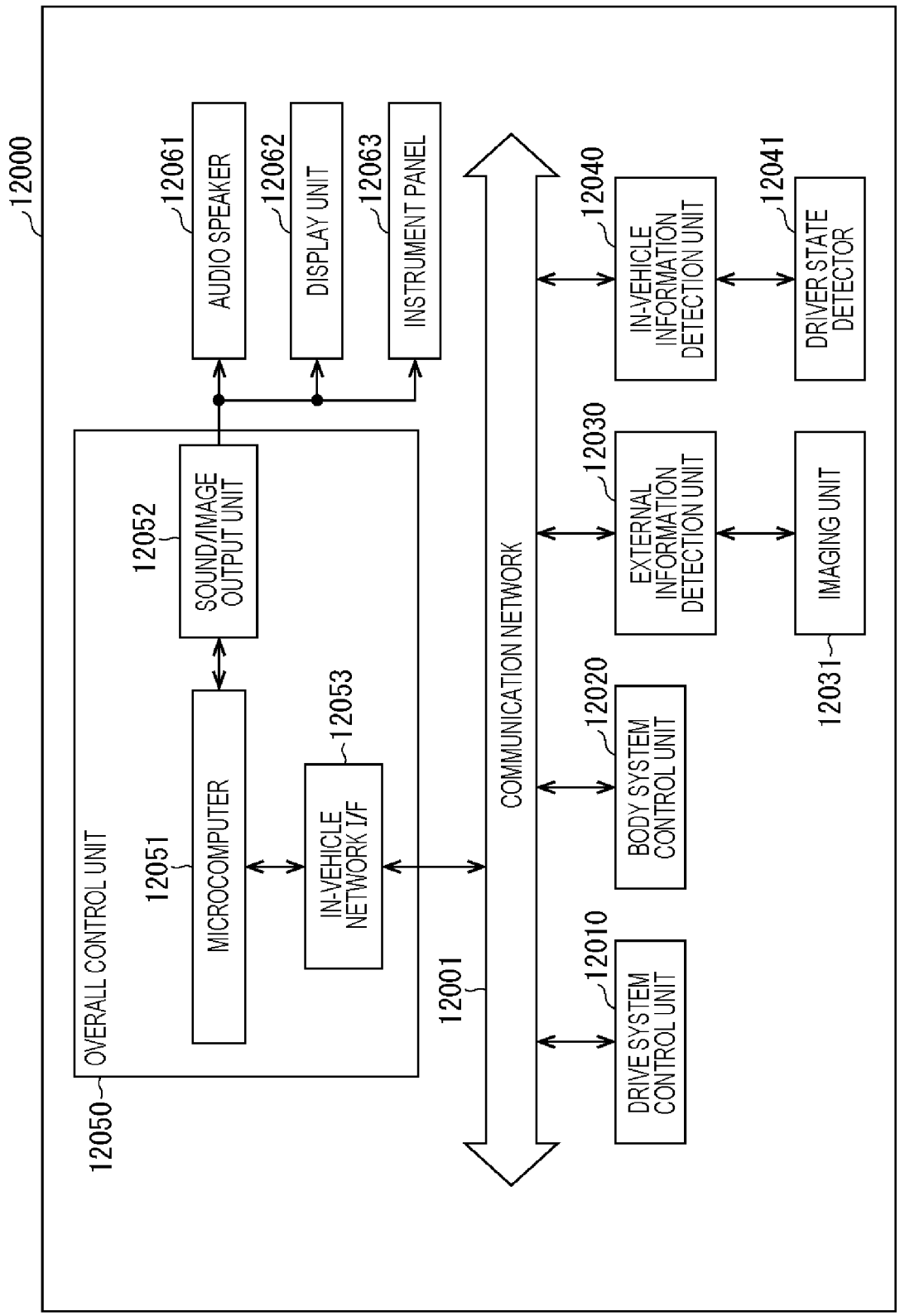
FIG. 27 is a block diagram showing a schematic example configuration of a vehicle control system.

FIG. 27 is a block diagram showing a schematic example configuration of a vehicle control system that is an example of a mobile structure control system to which the technology according to the present disclosure can be applied.

A vehicle control system 12000 includes a plurality of electronic control units connected via a communication network 12001. In the example shown in FIG. 27, the vehicle control system 12000 includes a drive system control unit 12010, a body system control unit 12020, an external information detection unit 12030, an in-vehicle information detection unit 12040, and an overall control unit 12050. Further, a microcomputer 12051, a sound/image output unit 12052, and an in-vehicle network interface (I/F) 12053 are shown as the functional components of the overall control unit 12050.

The drive system control unit 12010 controls operations of the devices related to the drive system of the vehicle according to various programs. For example, the drive system control unit 12010 functions as control devices such as a driving force generation device for generating a driving force of the vehicle such as an internal combustion engine or a driving motor, a driving force transmission mechanism for transmitting the driving force to the wheels, a steering mechanism for adjusting the steering angle of the vehicle, and a braking device for generating a braking force of the vehicle.

The body system control unit 12020 controls operations of the various devices mounted on the vehicle body according to various programs. For example, the body system control unit 12020 functions as a keyless entry system, a smart key system, a power window device, or a control device for various lamps such as a headlamp, a backup lamp, a brake lamp, a turn signal lamp, a fog lamp, or the like. In this case, the body system control unit 12020 can receive radio waves transmitted from a portable device that substitutes for a key, or signals from various switches. The body system control unit 12020 receives inputs of these radio waves or signals, and controls the door lock device, the power window device, the lamps, and the like of the vehicle.

The external information detection unit 12030 detects information about the outside of the vehicle equipped with the vehicle control system 12000. For example, an imaging unit 12031 is connected to the external information detection unit 12030. The external information detection unit 12030 causes the imaging unit 12031 to capture an image of the outside of the vehicle, and receives the captured image. On the basis of the received image, the external information detection unit 12030 may perform an object detection process for detecting a person, a vehicle, an obstacle, a sign, characters on the road surface, or the like, or perform a distance detection process.

The imaging unit 12031 is an optical sensor that receives light, and outputs an electrical signal corresponding to the amount of received light. The imaging unit 12031 can output an electrical signal as an image, or output an electrical signal as ranging information. Further, the light to be received by the imaging unit 12031 may be visible light, or may be invisible light such as infrared rays.

The in-vehicle information detection unit 12040 detects information about the inside of the vehicle. For example, a driver state detector 12041 that detects the state of the driver is connected to the in-vehicle information detection unit 12040. The driver state detector 12041 includes a camera that captures an image of the driver, for example, and, on the basis of detected information input from the driver state detector 12041, the in-vehicle information detection unit 12040 may calculate the degree of fatigue or the degree of concentration of the driver, or determine whether or not the driver is dozing off.

On the basis of the external/internal information acquired by the external information detection unit 12030 or the in-vehicle information detection unit 12040, the microcomputer 12051 can calculate the control target value of the driving force generation device, the steering mechanism, or the braking device, and output a control command to the drive system control unit 12010. For example, the microcomputer 12051 can perform cooperative control to achieve the functions of an advanced driver assistance system (ADAS), including vehicle collision avoidance or impact mitigation, follow-up running based on the distance between vehicles, vehicle velocity maintenance running, vehicle collision warning, vehicle lane deviation warning, or the like.

Further, the microcomputer 12051 can also perform cooperative control to conduct automatic driving or the like for autonomously running not depending on the operation of the driver, by controlling the driving force generation device, the steering mechanism, the braking device, or the like on the basis of information about the surroundings of the vehicle, the information having being acquired by the external information detection unit 12030 or the in-vehicle information detection unit 12040.

The microcomputer 12051 can also output a control command to the body system control unit 12020, on the basis of the external information acquired by the external information detection unit 12030. For example, the microcomputer 12051 controls the headlamp in accordance with the position of the leading vehicle or the oncoming vehicle detected by the external information detection unit 12030, and performs cooperative control to achieve an anti-glare effect by switching from a high beam to a low beam, or the like.

The sound/image output unit 12052 transmits an audio output signal and/or an image output signal to an output device that is capable of visually or audibly notifying the passenger(s) of the vehicle or the outside of the vehicle of information. In the example shown in FIG. 27, an audio speaker 12061, a display unit 12062, and an instrument panel 12063 are shown as output devices. The display unit 12062 may include an on-board display and/or a head-up display, for example.

Figure 28:
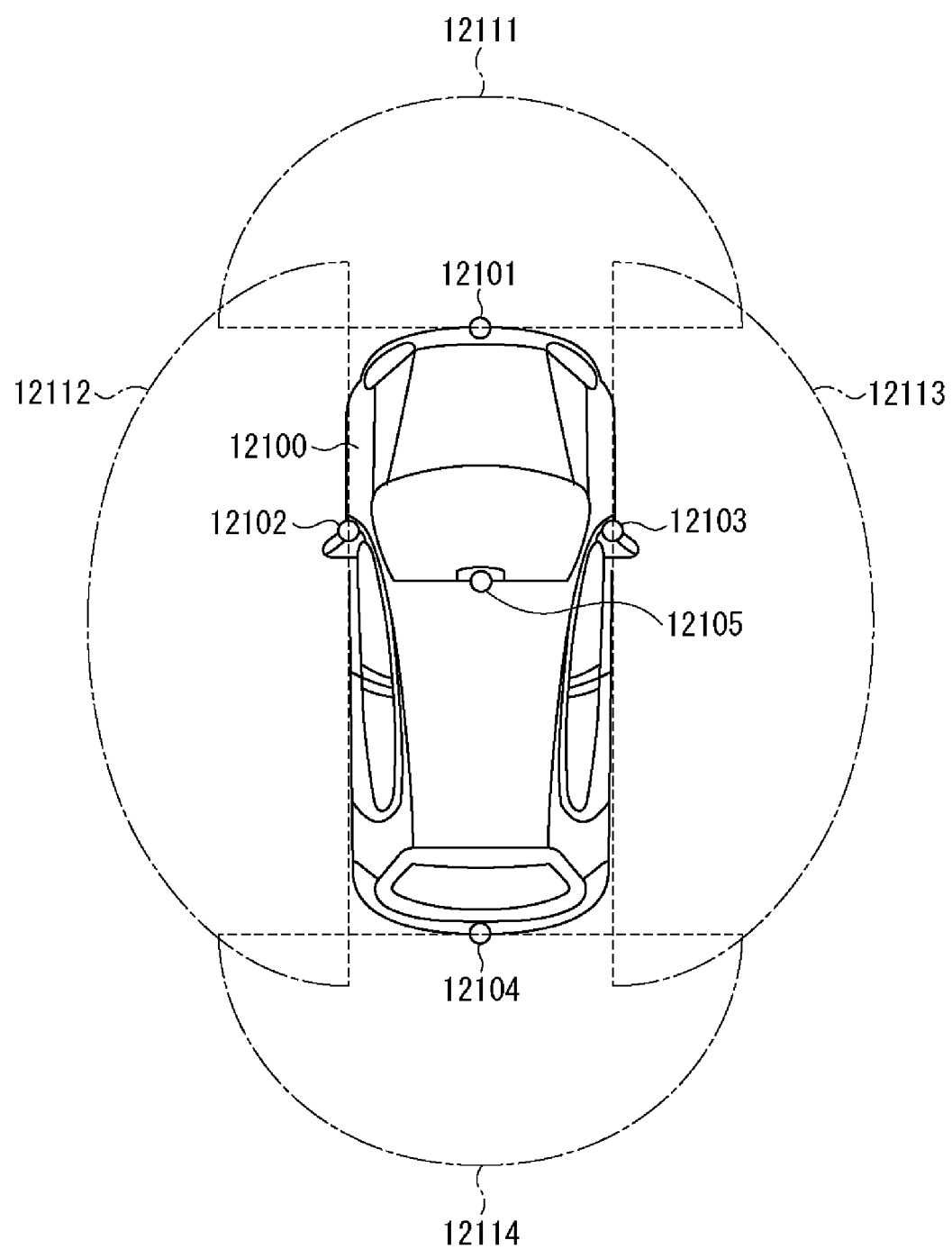
FIG. 28 is an explanatory diagram showing an example of installation positions of external information detectors and imaging units.

FIG. 28 is a diagram showing an example of installation positions of imaging units 12031.

In FIG. 28, a vehicle 12100 includes imaging units 12101, 12102, 12103, 12104, and 12105 as the imaging units 12031.

The imaging units 12101, 12102, 12103, 12104, and 12105 are provided at the following positions: the front end edge of the vehicle 12100, a side mirror, the rear bumper, a rear door, an upper portion of the front windshield inside the vehicle, and the like, for example. The imaging unit 12101 provided on the front end edge and the imaging unit 12105 provided on the upper portion of the front windshield inside the vehicle mainly capture images ahead of the vehicle 12100. The imaging units 12102 and 12103 provided on the side mirrors mainly capture images on the sides of the vehicle 12100. The imaging unit 12104 provided on the rear bumper or a rear door mainly captures images behind the vehicle 12100. The front images acquired by the imaging units 12101 and 12105 are mainly used for detection of a vehicle running in front of the vehicle 12100, a pedestrian, an obstacle, a traffic signal, a traffic sign, a lane, or the like.

Note that FIG. 28 shows an example of the imaging ranges of the imaging units 12101 to 12104. An imaging range 12111 indicates the imaging range of the imaging unit 12101 provided on the front end edge, imaging ranges 12112 and 12113 indicate the imaging ranges of the imaging units 12102 and 12103 provided on the respective side mirrors, and an imaging range 12114 indicates the imaging range of the imaging unit 12104 provided on the rear bumper or a rear door. For example, image data captured by the imaging units 12101 to 12104 are superimposed on one another, so that an overhead image of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, on the basis of distance information obtained from the imaging units 12101 to 12104, the microcomputer 12051 calculates the distances to the respective three-dimensional objects within the imaging ranges 12111 to 12114, and temporal changes in the distances (the velocities relative to the vehicle 12100). In this manner, the three-dimensional object that is the closest three-dimensional object in the traveling path of the vehicle 12100 and is traveling at a predetermined velocity (0 km/h or higher, for example) in substantially the same direction as the vehicle 12100 can be extracted as the vehicle running in front of the vehicle 12100. Further, the microcomputer 12051 can set beforehand an inter-vehicle distance to be maintained in front of the vehicle running in front of the vehicle 12100, and can perform automatic brake control (including follow-up stop control), automatic acceleration control (including follow-up start control), and the like. In this manner, it is possible to perform cooperative control to conduct automatic driving or the like to autonomously travel not depending on the operation of the driver.

For example, in accordance with the distance information obtained from the imaging units 12101 to 12104, the microcomputer 12051 can extract three-dimensional object data concerning three-dimensional objects under the categories of two-wheeled vehicles, regular vehicles, large vehicles, pedestrians, utility poles, and the like, and use the three-dimensional object data in automatically avoiding obstacles. For example, the microcomputer 12051 classifies the obstacles in the vicinity of the vehicle 12100 into obstacles visible to the driver of the vehicle 12100 and obstacles difficult for the driver to visually recognize. The microcomputer 12051 then determines collision risks indicating the risks of collision with the respective obstacles. If a collision risk is equal to or higher than a set value, and there is a possibility of collision, the microcomputer 12051 can output a warning to the driver via the audio speaker 12061 and the display unit 12062, or can perform driving support for avoiding collision by performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not a pedestrian exists in images captured by the imaging units 12101 to 12104. Such pedestrian recognition is carried out through a process of extracting feature points from the images captured by the imaging units 12101 to 12104 serving as infrared cameras, and a process of performing pattern matching on the series of feature points indicating the outlines of objects and determining whether or not there is a pedestrian, for example. If the microcomputer 12051 determines that a pedestrian exists in the images captured by the imaging units 12101 to 12104, and recognizes a pedestrian, the sound/image output unit 12052 controls the display unit 12062 to display a rectangular contour line for emphasizing the recognized pedestrian in a superimposed manner. Further, the sound/image output unit 12052 may also control the display unit 12062 to display an icon or the like indicating the pedestrian at a desired position.

An example of a vehicle control system to which the technology according to the present disclosure can be applied has been described above. The technology according to the present disclosure can be applied to the external information detection unit 12030 and the in-vehicle information detection unit 12040 among the components described above. Specifically, ranging by the ranging module 11 is used as the external information detection unit 12030 and the in-vehicle information detection unit 12040, to perform a process of recognizing a gesture of the driver. Thus, various systems (an audio system, a navigation system, and an air conditioning system, for example) can be operated in accordance with gestures, and a state of the driver can be detected more accurately. Also, ranging by the ranging module 11 can be used to recognize unevenness of a road surface and cause the suspension control to reflect the recognition.

Note that the present technology can be applied to a method for performing amplitude modulation on light projected onto an object. This method is referred to as a continuous wave method among indirect ToF methods. Further, the structure of the photodiode 51 of the light receiving unit 15 can be applied to a ranging sensor having a structure in which electric charges are distributed to two charge storage portions, such as a ranging sensor having a current-assisted photonic demodulator (CAPD) structure, or a gate-type ranging sensor that alternately applies pulses with electric charges of the photodiode to two gates.

Further, in the cases described in the above embodiments, a pixel 31 is a 2-tap structure that distributes the electric charges generated by the photodiode 51 to the two taps: the first tap 52A and the second tap 52B. However, the present technology can also be applied to a pixel structure having some other number of taps, such as a 1-tap structure or a 4-tap structure.

Embodiments of the present technology are not limited to the embodiments described above, and various modifications may be made to them without departing from the scope of the present technology.

As long as there is no inconsistency, the plurality of the present technologies described in this specification can be implemented independently of one another. It is of course also possible to implement a combination of some of the plurality of the present technologies. For example, part or all of the present technology described in one of the embodiments may be implemented in combination with part or all of the present technology described in another one of the embodiments. Further, part or all of the present technology described above may be implemented in combination with some other technology not described above.

Furthermore, any configuration described above as one device (or one processing unit) may be divided into a plurality of devices (or processing units), for example. Conversely, any configuration described above as a plurality of devices (or processing units) may be combined into one device (or one processing unit). Furthermore, it is of course possible to add a component other than those described above to the configuration of each device (or each processing unit). Further, some components of a device (or processing unit) may be incorporated into the configuration of another device (or processing unit) as long as the configuration and the functions of the entire system remain substantially the same.

Further, in this specification, a system means an assembly of a plurality of components (devices, modules (parts), and the like), and not all the components need to be provided in the same housing. In view of this, a plurality of devices that are housed in different housings and are connected to one another via a network forms a system, and one device having a plurality of modules housed in one housing is also a system.

Note that the advantageous effects described in this specification are merely examples, and the advantageous effects of the present technology are not limited to them and may include effects other than those described in this specification.

Note that the present technology may also be embodied in the configurations described below.

(1)
A ranging sensor including:
a phase shift circuit that generates a phase-shifted drive pulse signal by shifting a drive pulse signal to a plurality of phases in a time division manner within one frame period, the drive pulse signal being generated in response to a light emission control signal indicating an irradiation timing of a light emission source; and
a pixel that accumulates electric charges on the basis of the phase-shifted drive pulse signal and outputs a detection signal corresponding to the accumulated electric charges, the electric charges being obtained by photoelectrically converting reflected light that is reflected by a predetermined object reflecting light emitted from the light emission source.

(2)
The ranging sensor according to (1), in which
the phase shift circuit shifts the drive pulse signal to a first phase at a first timing within one frame period, and shifts the drive pulse signal to a second phase at a second timing.

(3)
The ranging sensor according to (1) or (2), in which
a first period during which the phase-shifted drive pulse signal shifted to the first phase is generated differs from a second period during which the phase-shifted drive pulse signal shifted to the second phase is generated.

(4)
The ranging sensor according to any one of (1) to (3), in which
the phase shift circuit generates the phase-shifted drive pulse signal shifted to three or more phases in a time division manner within one frame period.

(5)
The ranging sensor according to any one of (1) to (4), further including
a pixel array in which the pixels are two-dimensionally arranged in a matrix,
in which the pixel includes:
a photoelectric conversion portion that photoelectrically converts the reflected light;
a first charge storage portion that accumulates the electric charges on the basis of the phase-shifted drive pulse signal; and
a second charge storage portion that accumulates the electric charges on the basis of a signal obtained by reversing a phase with respect to the phase-shifted drive pulse signal.

(6)
The ranging sensor according to (5), including
at least two of the phase shift circuits, including a first phase shift circuit and a second phase shift circuit,
in which the first phase shift circuit generates the phase-shifted drive pulse signal to be supplied to the pixel in a first region of the pixel array, and
the second phase shift circuit generates the phase-shifted drive pulse signal to be supplied to the pixel in a second region different from the first region of the pixel array.

(7)
The ranging sensor according to (6), in which
a phase to be shifted by the first phase shift circuit and a phase to be shifted by the second phase shift circuit differ from each other at least during part of one frame period.

(8)
The ranging sensor according to (6), in which
a phase to be shifted by the first phase shift circuit and a phase to be shifted by the second phase shift circuit differ from each other during one entire frame period.

(9)
The ranging sensor according to any one of (6) to (8), in which
each of the first region and the second region includes at least one pixel column.

(10)
The ranging sensor according to any one of (6) to (9), in which
each of the first region and the second region includes a plurality of pixel columns.

(11)
The ranging sensor according to (6), in which
the first region and the second region are located to divide the pixel array in a vertical direction.

(12)
The ranging sensor according to (6), in which
the first region and the second region are placed in a checkered pattern.

(13)

The ranging sensor according to any one of (6) to (12), in which a phase to be shifted by the first phase shift circuit and a phase to be shifted by the second phase shift circuit are in an orthogonal relation.

(14)

The ranging sensor according to any one of (1) to (13), further including a pulse generation circuit that generates the drive pulse signal on the basis of the light emission control signal, and supplies the drive pulse signal to the phase shift circuit.

(15)

The ranging sensor according to any one of (1) to (14), further including a control circuit that controls a timing at which the phase shift circuit changes the phase of the phase-shifted drive pulse signal.

(16)

The ranging sensor according to any one of (1) to (15), further including a light emission control unit that generates the light emission control signal, and supplies the light emission control signal to the light emission source.

(17)

The ranging sensor according to any one of (1) to (16), which is formed with one chip in which a plurality of dies is stacked.

(18)

A method for driving a ranging sensor including a phase shift circuit and a pixel, the method including:

generating a phase-shifted drive pulse signal by shifting a phase of a drive pulse signal generated in accordance with a light emission control signal indicating an irradiation timing of a light emission source, the phase shift circuit generating the phase-shifted drive pulse signal; and accumulating electric charges on the basis of the phase-shifted drive pulse signal and outputs a detection signal corresponding to the accumulated electric charges, the electric charges being obtained by photoelectrically converting reflected light that is reflected by a predetermined object reflecting light emitted from the light emission source, the pixel accumulating the electric charges and outputting the detection signal.

(19)

A ranging module including:

a light emission source that emits light onto a predetermined object at an irradiation timing based on a light emission control signal; and a ranging sensor that receives reflected light that is reflected by the predetermined object reflecting the light emitted from the light emission source, in which the ranging sensor includes:

a phase shift circuit that generates a phase-shifted drive pulse signal by shifting a phase of a drive pulse signal generated in response to the light emission control signal; and a pixel that accumulates electric charges on the basis of the phase-shifted drive pulse signal and outputs a detection signal corresponding to the accumulated electric charges, the electric charges being obtained by photoelectrically converting the reflected light.

REFERENCE SIGNS LIST

11 Ranging module
12 Light emitting unit
13 Light emitting unit
14 Light emission control unit
15 Light receiving unit
16 Signal processing unit
31 Pixel
32 Pixel array
33 Drive control circuit
52A First tap
52B Second tap
71 Pulse generation circuit
72 Controller
81 Phase shift circuit
82 Block drive unit
BL Block
201 Smartphone
202 Ranging module

The invention claimed is:

1. A ranging sensor comprising:
a pixel array including pixels two-dimensionally arranged in a matrix, wherein the pixels respectively include:
a photoelectric conversion portion that photoelectrically converts reflected light,
a first charge storage portion that accumulates electric charges on a basis of a phase-shifted drive pulse signal, and
a second charge storage portion that accumulates the electric charges on a basis of a signal obtained by reversing a phase with respect to the phase-shifted drive pulse signal;
a phase shift circuit that generates the phase-shifted drive pulse signal by shifting a drive pulse signal to at least three phases in a time division manner within one frame period, the drive pulse signal being generated in response to a light emission control signal indicating an irradiation timing of a light emission source; and
wherein the pixels respectively accumulate the electric charges on a basis of the phase-shifted drive pulse signal and output a detection signal corresponding to the accumulated electric charges, the electric charges being obtained by photoelectrically converting reflected light that is reflected by a target object reflecting light emitted from the light emission source.

2. The ranging sensor according to claim 1, wherein the phase shift circuit shifts the drive pulse signal to a first phase at a first timing within one frame period, and shifts the drive pulse signal to a second phase at a second timing.

3. The ranging sensor according to claim 2, wherein a first period during which the phase-shifted drive pulse signal shifted to the first phase is generated differs from a second period during which the phase-shifted drive pulse signal shifted to the second phase is generated.

4. The ranging sensor according to claim 1, wherein
the phase shift circuit is one of at least two phase shift circuits, including a first phase shift circuit and a second phase shift circuit,
wherein the first phase shift circuit generates the phase-shifted drive pulse signal to be supplied to a respective pixel in a first region of the pixel array, and
the second phase shift circuit generates the phase-shifted drive pulse signal to be supplied to the respective pixel in a second region different from the first region of the pixel array.

5. The ranging sensor according to claim 4, wherein a phase to be shifted by the first phase shift circuit and a phase to be shifted by the second phase shift circuit differ from each other at least during part of one frame period.

6. The ranging sensor according to claim 4, wherein a phase to be shifted by the first phase shift circuit and a phase to be shifted by the second phase shift circuit differ from each other during one entire frame period.

7. The ranging sensor according to claim 4, wherein each of the first region and the second region includes at least one pixel column.

8. The ranging sensor according to claim 4, wherein each of the first region and the second region includes a plurality of pixel columns.

9. The ranging sensor according to claim 4, wherein the first region and the second region are located to divide the pixel array in a vertical direction.

10. The ranging sensor according to claim 4, wherein the first region and the second region are arranged in a checkered pattern.

11. The ranging sensor according to claim 4, wherein a phase to be shifted by the first phase shift circuit and a phase to be shifted by the second phase shift circuit are in an orthogonal relation.

12. The ranging sensor according to claim 1, further comprising a pulse generation circuit that generates the drive pulse signal on a basis of the light emission control signal, and supplies the drive pulse signal to the phase shift circuit.

13. The ranging sensor according to claim 1, further comprising a control circuit that controls a timing at which the phase shift circuit changes a phase of the phase-shifted drive pulse signal.

14. The ranging sensor according to claim 1, further comprising
a light emission control unit that generates the light emission control signal, and supplies the light emission control signal to the light emission source.

15. The ranging sensor according to claim 1, which is formed with one chip in which a plurality of dies is stacked.

16. A ranging module comprising:
a light emission source that emits light onto a target object at an irradiation timing based on a light emission control signal; and
a ranging sensor that receives reflected light that is reflected by the target object reflecting the light emitted from the light emission source,
wherein the ranging sensor includes:
a pixel array including pixels two-dimensionally arranged in a matrix, wherein the pixels respectively include:
a photoelectric conversion portion that photoelectrically converts reflected light,
a first charge storage portion that accumulates electric charges on a basis of a phase-shifted drive pulse signal, and
a second charge storage portion that accumulates the electric charges on a basis of a signal obtained by reversing a phase with respect to the phase-shifted drive pulse signal;
a phase shift circuit that generates the phase-shifted drive pulse signal by shifting a drive pulse signal to at least three phases in a time division manner within one frame period, the drive pulse signal being generated in response to a light emission control signal indicating an irradiation timing of the light emission source; and
wherein the pixels respectively accumulate electric charges on a basis of the phase-shifted drive pulse signal and output a detection signal corresponding to the accumulated electric charges, the electric charges being obtained by photoelectrically converting the reflected light.

17. The ranging module according to claim 16, wherein the phase shift circuit shifts the drive pulse signal to a first phase at a first timing within one frame period, and shifts the drive pulse signal to a second phase at a second timing.

18. The ranging module according to claim 17, wherein a first period during which the phase-shifted drive pulse signal shifted to the first phase is generated differs from a second period during which the phase-shifted drive pulse signal shifted to the second phase is generated.

* * * * *